United States Patent
Li et al.

(10) Patent No.: US 11,496,267 B2
(45) Date of Patent: Nov. 8, 2022

(54) COMMUNICATION METHOD AND COMMUNICATIONS APPARATUS

(71) Applicant: HUAWEI TECHNOLOGIES CO., LTD., Guangdong (CN)

(72) Inventors: Junchao Li, Shanghai (CN); Hao Tang, Shanghai (CN); Zhenfei Tang, Ottawa (CA); Yueying Zhao, Shanghai (CN); Wenwen Huang, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 99 days.

(21) Appl. No.: 16/519,155

(22) Filed: Jul. 23, 2019

(65) Prior Publication Data

US 2019/0349170 A1 Nov. 14, 2019

Related U.S. Application Data

(63) Continuation of application No. PCT/CN2018/073583, filed on Jan. 22, 2018.

(30) Foreign Application Priority Data

Jan. 25, 2017 (CN) .......................... 201710061338.1

(51) Int. Cl.
*H04L 5/00* (2006.01)
*H04W 72/04* (2009.01)

(52) U.S. Cl.
CPC .......... *H04L 5/0053* (2013.01); *H04W 72/042* (2013.01)

(58) Field of Classification Search
CPC ... H04L 5/0053; H04L 5/0064; H04L 5/0073; H04L 5/003; H04L 5/0094; H04L 1/00;

(Continued)

(56) References Cited

U.S. PATENT DOCUMENTS

2013/0301549 A1* 11/2013 Chen .................. H04B 7/024
                                                    370/329
2014/0128085 A1*  5/2014 Charbit ................ H04L 5/00
                                                    455/450

(Continued)

FOREIGN PATENT DOCUMENTS

CN    102202324 A    9/2011
CN    103812602 A    5/2014

(Continued)

OTHER PUBLICATIONS

Partial Supplementary Extended European Search Report issued in European Application No. 18744336.1 dated Nov. 19, 2019, 14 pages.

(Continued)

*Primary Examiner* — Peter P Chau
(74) *Attorney, Agent, or Firm* — Fish & Richardson P.C.

(57) ABSTRACT

The present disclosure relates to communication methods and communications apparatus. One example method includes receiving, by a terminal, configuration information sent by a network device, where the configuration information is used to indicate a resource in a plurality of candidate resources of a common search space, and the candidate resources of the common search space are determined based on one or more of a cell identity, downlink bandwidth, a frequency domain resource location of a synchronization channel, and a frequency domain resource location of a broadcast channel, and receiving, by the terminal, common control information on the resource indicated by the configuration information.

19 Claims, 8 Drawing Sheets

(58) Field of Classification Search
CPC .. H04L 5/0048; H04L 1/0027; H04W 72/042; H04W 72/04
See application file for complete search history.

(56) References Cited

U.S. PATENT DOCUMENTS

| | | | |
|---|---|---|---|
| 2014/0133331 A1 | 5/2014 | Fu et al. | |
| 2014/0177556 A1 | 6/2014 | Pan et al. | |
| 2014/0369437 A1* | 12/2014 | Horiuchi | H04L 5/0053 375/267 |
| 2014/0376486 A1 | 12/2014 | Lee et al. | |
| 2016/0164653 A1* | 6/2016 | Wang | H04L 5/0048 370/329 |
| 2017/0272895 A1* | 9/2017 | Park | H04W 28/0215 |
| 2018/0007673 A1* | 1/2018 | Fwu | H04L 5/0092 |
| 2018/0034605 A1 | 2/2018 | Fang et al. | |

FOREIGN PATENT DOCUMENTS

| | | |
|---|---|---|
| CN | 104185197 A | 12/2014 |
| CN | 104936183 A | 9/2015 |
| CN | 106304301 A | 1/2017 |
| EP | 2943027 A1 | 11/2015 |
| JP | 2016529806 A | 9/2016 |
| WO | 2014022100 A2 | 2/2014 |
| WO | 2016048063 A1 | 3/2016 |

OTHER PUBLICATIONS

Huawei et al.."Time and frequency resources for DL control channels",3GPP TSG RAN WG1 Meeting #87 R1-1611210,Reno, USA, Nov. 14-18, 2016, 3 pages.
Huawei et al.,"Discussion on search space design for DL control channels",3GPP TSG RAN WG1 Meeting #87 R1-1611211,Reno, USA, Nov. 14-18, 2016, 3 pages.
Ran1 et al., "RAN1 Chairman's Notes", 3GPP TSG RAN WG1 Meeting #87, Reno, USA, Nov. 14-18, 2016, 115 pages.
PCT International Search Report and Written Opinion in International Application No. PCT/CN2018/073,583, dated Apr. 19, 2018, 15 pages (With English Translation).
Office Action issued in Chinese Application No. 201710061338.1 dated Mar. 29, 2021, 12 pages.
Office Action issued in Japanese Application No. 2019-560443 dated Nov. 24, 2020, 9 pages (with English translation).

* cited by examiner

COMMUNICATION METHOD AND COMMUNICATIONS APPARATUS

CROSS-REFERENCE TO RELATED APPLICATIONS

This application is a continuation of International Application No. PCT/CN2018/073583, filed on Jan. 22, 2018, which claims priority to Chinese Patent Application No. 201710061338.1, filed Jan. 25, 2017. The disclosures of the aforementioned applications are hereby incorporated by reference in their entireties.

TECHNICAL FIELD

Embodiments of this application relate to communications technologies, and in particular, to a communication method and a communications apparatus.

BACKGROUND

With development of wireless communications technologies, performance such as a peak rate and system bandwidth of a wireless network is continuously improved, and brings better service experience to users. In this way, wireless communication is more widely applied. As wireless communication applications spread, the wireless network has more application scenarios. Therefore, resources need to be configured more flexibly.

SUMMARY

Embodiments of this application provide a communication method and a communications apparatus, to improve resource configuration flexibility.

According to a first aspect, this application provides a communication method, including:

receiving, by a terminal, configuration information sent by a network device, where the configuration information is used to indicate a resource in a plurality of candidate resources of a common search space, and the candidate resources of the common search space are determined based on one or more of a cell identity, downlink bandwidth, a frequency domain resource location of a synchronization channel, and a frequency domain resource location of a broadcast channel; and receiving, by the terminal, common control information on the resource indicated by the configuration information.

The cell identity may be an identity that is semi-statically or statically configured for a cell, for example, may be a physical cell identifier (Physical Cell Identifier, PCI). Certainly, the cell identity may alternatively be determined in another manner. For example, when two cells are geographically close and reference signals from the two cells are quasi-co-located (Quasi-Co-Located, QCL), the two cells may use a same common cell identity. In this case, that reference signals are QCL indicates that the reference signals are similar in at least one large-scale fading characteristic in information such as a Doppler shift, a Doppler spread, an average delay, or a time domain spread. Therefore, the cell identity may alternatively be determined depending on a result of negotiation between network devices. After obtaining the cell identity through negotiation, the network devices may deliver the cell identity obtained after negotiation to terminals in cells by using physical layer signaling, broadcast signaling, or higher layer signaling.

In addition, the downlink bandwidth may be subband bandwidth of predefined bandwidth, or may be full system bandwidth.

In the communication method provided in the first aspect of this application, the terminal receives the configuration information sent by the network device, and receives the common control information on the resource indicated by the configuration information. The configuration information is used to indicate the resource in the plurality of candidate resources of the common search space, and the candidate resources of the common search space are determined based on one or more of the cell identity, the downlink bandwidth, the frequency domain resource location of the synchronization channel, and the frequency domain resource location of the broadcast channel. Because the network device determines the candidate resources of the common search space based on one or more of the cell identity, the downlink bandwidth, the frequency domain resource location of the synchronization channel, and the frequency domain resource location of the broadcast channel, and enables the terminal to receive the common control information on the resource indicated by the configuration information, a manner of determining the common search space can be more flexible.

Optionally, the receiving, by a terminal, configuration information sent by a network device includes: receiving, by the terminal, a master system information block MIB message sent by the network device. The MIB message includes the configuration information.

After determining the configuration information used to indicate the resource in the plurality of candidate resources of the common search space, the network device may add the configuration information to the MIB message and send the MIB message to the terminal, for example, may indicate the configuration information by using a css-Config field of the MIB. In addition, when indicating the configuration information by using the MIB message, the network device indicates the configuration information by using a css-Config field having a length of $\log_2 M$ in the MIB. M is a quantity of the candidate resources of the common search space.

Optionally, the common control information includes configuration information of at least one of a system message block (System Information Block, SIB), a random access response (Random Access Response, RAR), and a paging message.

Optionally, the configuration information includes indexes of the candidate resources.

Optionally, the configuration information is used to indicate a frequency domain resource start value of the resource.

The frequency domain resource start value is a frequency domain resource start location or a frequency domain resource offset, for example, may be a lowest PRB index.

Optionally, the common control information includes downlink control information (Downlink Control Information, DCI), and the DCI is used to indicate a format of a transmission unit and/or used to indicate a quantity of symbols in a physical downlink control region in the transmission unit.

The transmission unit is of a time domain structure, and may be a subframe, a slot, a mini-slot, an aggregated slot, an aggregated mini-slot, or the like. The format of the transmission unit is how a downlink control region, a downlink data region, an uplink data region, and an uplink control region in the transmission unit are arranged. The format of the transmission unit may include one or more of the following: (1) all-downlink: including a downlink control region and a downlink data region, or including only a downlink data region; (2) downlink-dominant: including a downlink control region, a downlink data region, and an uplink control region, or including a downlink data region and an uplink control region; (3) uplink-dominant: including a downlink control region, an uplink data region, and an uplink control region, or including a downlink control region and an uplink data region; and (4) all-uplink: including an uplink data region and an uplink control region, or including only an uplink data region, or including only an uplink control region.

In addition, the following several cases may occur for the DCI used to indicate the format of the transmission unit and/or used to indicate the quantity of symbols in the physical downlink control region in the transmission unit: (1) the DCI is used to indicate only the format of the transmission unit; (2) the DCI is used to indicate only the quantity of symbols in the physical downlink control region in the transmission unit; and (3) the DCI is used to indicate the format of the transmission unit and used to indicate the quantity of symbols in the physical downlink control region in the transmission unit.

Optionally, the common control information includes the DCI, the DCI includes configuration information, and the configuration information is used to indicate system bandwidth.

Specifically, the network device may determine the system bandwidth based on a quantity of data services in a network. For example, when there are a relatively small quantity of data services in the network, relatively small system bandwidth is used; when there are a relatively large quantity of data services in the network, relatively large system bandwidth is used. After determining the system bandwidth, the network device adds, to the DCI, the configuration information used to indicate the system bandwidth and sends the DCI to the terminal. After receiving the system bandwidth indicated by the network device, the terminal communicates by using the system bandwidth, for example, receives data and control information on the system bandwidth. Because the network device may determine the system bandwidth based on the quantity of data services in the network, the system bandwidth can be determined more flexibly.

Optionally, the method further includes: communicating, by the terminal by using the system bandwidth.

Specifically, after receiving the system bandwidth indicated by the network device, the terminal communicates by using the system bandwidth, for example, receives data and control information on the system bandwidth.

According to a second aspect, this application provides a communication method, including:

sending, by a network device, configuration information, where the configuration information is used to indicate a resource in a plurality of candidate resources of a common search space, and the candidate resources of the common search space are determined based on one or more of a cell identity, downlink bandwidth, a frequency domain resource location of a synchronization channel, and a frequency domain resource location of a broadcast channel; and sending, by the network device, common control information on the resource indicated by the configuration information.

After determining the plurality of candidate resources of the common search space, the network device selects one or more resources from the plurality of candidate resources, and indicates the one or more resources to the terminal. In addition, the network device sends the common control information on the resource indicated by the configuration information.

In the communication method provided in the second aspect of this application, the network device sends the configuration information, and sends the common control information on the resource indicated by the configuration information. The configuration information is used to indicate the resource in the plurality of candidate resources of the common search space, and the candidate resources of the common search space are determined based on one or more of the cell identity, the downlink bandwidth, the frequency domain resource location of the synchronization channel, and the frequency domain resource location of the broadcast channel. Because the network device determines the candidate resources of the common search space based on one or more of the cell identity, the downlink bandwidth, the frequency domain resource location of the synchronization channel, and the frequency domain resource location of the broadcast channel, and sends the common control information on the resource indicated by the configuration information, a manner of determining the common search space can be more flexible.

Optionally, the sending, by a network device, configuration information includes: sending, by the network device, a MIB message. The MIB message includes the configuration information.

After determining the plurality of candidate resources of the common search space, the network device selects one or more resources from the plurality of candidate resources, and indicates the one or more resources to the terminal by using the MIB.

Optionally, the common control information includes configuration information of at least one of a SIB, an RAR, and a paging message.

Optionally, the configuration information includes indexes of the candidate resources.

Optionally, the configuration information is used to indicate a frequency domain resource start value of the resource.

Optionally, the common control information includes DCI, and the DCI is used to indicate a format of a transmission unit and/or used to indicate a quantity of symbols in a physical downlink control region in the transmission unit.

Optionally, the common control information includes the DCI, the DCI includes configuration information, and the configuration information is used to indicate system bandwidth.

According to a third aspect, this application provides a communication method, including:

receiving, by a terminal, configuration information sent by a network device, where the configuration information is used to indicate a frequency domain resource start value of a physical channel, and the physical channel is used to indicate a format of a transmission unit and/or used to indicate a quantity of symbols in a physical downlink control region in the transmission unit; and receiving, by the terminal, the physical channel on a resource indicated by the frequency domain resource start value.

The physical channel may be a new physical downlink channel different from a physical downlink control channel PDCCH, or may be DCI. A specific form of the physical channel is not limited herein in this embodiment. The frequency domain resource start value is also referred to as a frequency domain resource offset or a frequency domain resource start location, for example, may be a lowest PRB index. In addition, the transmission unit is of a time domain structure, and may be a subframe, a slot, a mini-slot, an aggregated slot, an aggregated mini-slot, or the like.

In the communication method provided in the third aspect of this application, the terminal receives the configuration information sent by the network device. The configuration information is used to indicate the frequency domain resource start value of the physical channel, and the physical channel is used to indicate the format of the transmission unit and/or used to indicate the quantity of symbols in the physical downlink control region in the transmission unit. The terminal receives the physical channel on the resource indicated by the frequency domain resource start value. Because the network device sends, to the terminal, the configuration information used to indicate the frequency domain resource start value of the physical channel, and the terminal receives the physical channel on the resource indicated by the frequency domain resource start value, the physical channel can be configured more flexibly.

Optionally, the receiving, by a terminal, configuration information sent by a network device includes: receiving broadcast signaling or higher layer signaling sent by the network device. The broadcast signaling or the higher layer signaling includes the configuration information.

The broadcast signaling may be, for example, a MIB message. The higher layer signaling may be, for example, a SIB message or a user-specific radio resource control (Radio Resource Control, RRC) message. Because the network device sends the configuration information to the terminal by using the broadcast signaling or the higher layer signaling, some users may detect the configuration information.

Optionally, a frequency domain resource to which the physical channel is mapped is determined based on one or more of a cell identity and bandwidth that corresponds to a control resource subset.

The cell identity may be an identity that is semi-statically or statically configured for a cell, for example, may be a PCI. In addition, the control resource subset is subband bandwidth of predefined bandwidth, and the terminal performs blind detection for downlink control information in the control resource subset.

Optionally, a time domain resource to which the physical channel is mapped is the first symbol of the transmission unit.

Optionally, the control resource subset is used to transmit common downlink control information, and the common downlink control information includes configuration information of at least one of a system message block SIB, a random access response RAR, and a paging message.

Optionally, the control resource subset is used to transmit user group-specific downlink control information and/or user-specific downlink control information.

Specifically, the physical channel is mapped to a control resource subset in which a common search space/a user group-specific search space is located, so that a user can detect the physical channel when detecting the common search space. The common search space is used to transmit common downlink control information, and all users in a cell need to receive the common downlink control information. The user group-specific search space is used to transmit user group-specific downlink control information, and one or more users in a cell need to receive the user group-specific downlink control information.

In addition, the control resource subset may be used to transmit only the user group-specific downlink control information, or the control resource subset may be used to transmit only the user-specific downlink control information, or the control resource subset may be used to transmit the user group-specific downlink control information and the user-specific downlink control information. Optionally, the frequency domain resource start value is a lowest PRB index corresponding to the control resource subset.

Optionally, mapping the physical channel to the resource includes:

performing channel coding on an information bit corresponding to the physical channel; scrambling a coded bit, where the scrambling sequence is determined by using the cell identity and a transmission unit index; modulating a scrambled bit; and mapping a modulated symbol to the resource.

Specifically, a physical layer processing process of the physical channel includes: first performing channel coding with a code rate of $1/16$ on the information bit corresponding to the physical channel, for example, 2-bit indication information of a transmission unit structure, to obtain a 32-bit codeword; then scrambling the 32-bit codeword by using the scrambling sequence that is determined by using the cell identity and the transmission unit index; then performing QPSK modulation on a 32-bit scrambled codeword, to obtain 16 modulated symbols; and mapping the 16 modulated symbols to a frequency band in which the control resource subset is located.

Optionally, the resource is in resources corresponding to K predefined downlink control channel elements (Control Channel Element, CCE) on a downlink control channel.

Optionally, the K CCEs are the first K CCEs of the downlink control channel.

Specifically, to ensure that presence or absence of the physical channel has minimum impact on blind detection for a control channel by a user, the modulated symbols may be further centrally mapped to several predefined CCEs in the control resource subset as far as possible.

Optionally, unless it is indicated to the terminal that a given transmission unit does not include the physical channel, it is generally considered that a CCE corresponding to the physical channel does not include downlink control information.

Optionally, information corresponding to the physical channel is downlink control information, the downlink control information is carried on a downlink control channel, and the downlink control information is located in a common search space and/or a user group search space of the downlink control channel.

Optionally, the information corresponding to the physical channel is carried on L CCEs, L is a predefined quantity, a lowest CCE index of the L CCEs is predefined, and a quantity of candidate sets is 1.

Optionally, the lowest CCE index is an index of the first CCE of the common search space.

Optionally, the CCE index is an index of the first CCE of the user group search space.

Specifically, when the physical channel carries a relatively large quantity of information bits (for example, 25 bits), the physical channel is essentially common DCI or user group-specific DCI. In this case, to reduce complexity of blind detection by a user, the physical channel may be mapped to several predefined consecutive CCEs. The "predefined" herein means that both a CCE quantity and a CCE index are predefined. In other words, a start CCE used for the downlink control information that carries information is predefined, an aggregation level L is predefined, and a quantity of candidate sets is 1. For example, the 25-bit information is mapped to four CCEs in the control resource subset that start from the first CCE (it is assumed that an aggregation level is 4, a cyclic redundancy check (Cyclic Redundancy Check) has 24 bits, and QPSK modulation is performed).

According to a fourth aspect, this application provides a communication method, including:

sending, by a network device, configuration information, where the configuration information is used to indicate a frequency domain resource start value of a physical channel, and the physical channel is used to indicate a format of a transmission unit and/or used to indicate a quantity of symbols in a physical downlink control region in the transmission unit; and sending, by the network device, the physical channel on a resource indicated by the frequency domain resource start value.

In the communication method provided in the fourth aspect of this application, the network device sends the configuration information. The configuration information is used to indicate the frequency domain resource start value of the physical channel, and the physical channel is used to indicate the format of the transmission unit and/or used to indicate the quantity of symbols in the physical downlink control region in the transmission unit. The network device sends the physical channel on the resource indicated by the frequency domain resource start value. Because the network device sends, to a terminal, the configuration information used to indicate the frequency domain resource start value of the physical channel, and sends the physical channel on the resource indicated by the frequency domain resource start value, the physical channel can be configured more flexibly.

Optionally, the sending, by a network device, configuration information includes: sending, by the network device, broadcast signaling or higher layer signaling. The broadcast signaling or the higher layer signaling includes the configuration information.

The broadcast signaling may be, for example, a MIB message. The higher layer signaling may be, for example, a SIB message or a user-specific RRC message. Because the network device sends the configuration information to the terminal by using the broadcast signaling or the higher layer signaling, some users may detect the configuration information.

Optionally, a frequency domain resource to which the physical channel is mapped is determined based on one or more of a cell identity and bandwidth that corresponds to a control resource subset.

The cell identity may be an identity that is semi-statically or statically configured for a cell, for example, may be a PCI. In addition, the control resource subset is subband bandwidth of predefined bandwidth.

Optionally, a time domain resource to which the physical channel is mapped is the first symbol of the transmission unit.

Optionally, the control resource subset is used to transmit common downlink control information, and the common downlink control information includes configuration information of at least one of a system message block SIB, a random access response RAR, and a paging message.

Optionally, the control resource subset is used to transmit user group-specific downlink control information and/or user-specific downlink control information.

Specifically, the physical channel is mapped to a control resource subset in which a common search space/a user group-specific search space is located, so that a user can detect the physical channel when detecting the common search space. The common search space is used to transmit common downlink control information, and all users in a cell need to receive the common downlink control information. The user group-specific search space is used to transmit user group-specific downlink control information, and one or more users in a cell need to receive the user group-specific downlink control information.

In addition, the control resource subset may be used to transmit only the user group-specific downlink control information, or the control resource subset may be used to transmit only the user-specific downlink control information, or the control resource subset may be used to transmit the user group-specific downlink control information and the user-specific downlink control information.

Optionally, the frequency domain resource start value is a lowest PRB index corresponding to the control resource subset.

Optionally, mapping the physical channel to the resource includes: performing channel coding on an information bit corresponding to the physical channel; scrambling a coded bit, where the scrambling sequence is determined by using the cell identity and a transmission unit index; modulating a scrambled bit; and mapping a modulated symbol to the resource.

Specifically, a physical layer processing process of the physical channel includes: first performing channel coding with a code rate of $1/16$ on the information bit corresponding to the physical channel, for example, 2-bit indication information of a transmission unit structure, to obtain a 32-bit codeword; then scrambling the 32-bit codeword by using the scrambling sequence that is determined by using the cell identity and the transmission unit index; then performing QPSK modulation on a 32-bit scrambled codeword, to obtain 16 modulated symbols; and mapping the 16 modulated symbols to a frequency band in which the control resource subset is located.

Optionally, the resource is in resources corresponding to K predefined downlink control channel elements (Control Channel Element, CCE) on a downlink control channel.

Optionally, the K CCEs are the first K CCEs of the downlink control channel.

Specifically, to ensure that presence or absence of the physical channel has minimum impact on blind detection for a control channel by a user, the modulated symbols may be further centrally mapped to several predefined CCEs in the control resource subset as far as possible.

Optionally, unless it is indicated to the terminal that a given transmission unit does not include the physical channel, it is generally considered that a CCE corresponding to the physical channel does not include downlink control information.

Optionally, information corresponding to the physical channel is downlink control information, the downlink control information is carried on a downlink control channel, and the downlink control information is located in a common search space and/or a user group search space of the downlink control channel.

Optionally, the information corresponding to the physical channel is carried on L CCEs, L is a predefined quantity, a lowest CCE index of the L CCEs is predefined, and a quantity of candidate sets is 1.

Optionally, the lowest CCE index is an index of the first CCE of the common search space.

Optionally, the CCE index is an index of the first CCE of the user group search space.

Specifically, when the physical channel carries a relatively large quantity of information bits (for example, 25 bits), the physical channel is essentially common DCI or user group-specific DCI. In this case, to reduce complexity of blind detection by a user, the physical channel may be mapped to several predefined consecutive CCEs. The "predefined" herein means that both a CCE quantity and a CCE index are predefined. In other words, a start CCE used for the downlink control information that carries information is predefined, an aggregation level L is predefined, and a quantity of candidate sets is 1. For example, the 25-bit information is mapped to four CCEs in the control resource subset that start from the first CCE (it is assumed that an aggregation level is 4, a cyclic redundancy check (Cyclic Redundancy Check) has 24 bits, and QPSK modulation is performed).

According to a fifth aspect, this application provides a communication method, including:

receiving, by a terminal, DCI sent by a network device, where the DCI includes configuration information, and the configuration information is used to indicate system bandwidth; and communicating, by the terminal by using the system bandwidth.

The network device may determine the system bandwidth based on a quantity of data services. For example, when there are a relatively small quantity of data services in a network, relatively small system bandwidth is used; when there are a relatively large quantity of data services in a network, relatively large system bandwidth is used. The network device may add the configuration information to the DCI and send the DCI to the terminal, to indicate the system bandwidth determined by the network device to the terminal.

In the communication method provided in the fifth aspect of this application, the terminal receives the DCI sent by the network device. The DCI includes the configuration information, and the configuration information is used to indicate the system bandwidth. The terminal communicates by using the system bandwidth. Because the network device indicates the available system bandwidth to the terminal, and the terminal communicates based on the system bandwidth indicated by the network device, the system bandwidth can be determined more flexibly.

Optionally, the method further includes: sending capability information. The capability information is used to indicate that the terminal supports the system bandwidth.

Specifically, the terminal may report the capability information of the terminal by using an initial access preamble (a message 1) or a message 3. The network device determines, based on the capability information reported by the terminal, whether to flexibly configure bandwidth based on the quantity of data services, to determine a size of the system bandwidth. The capability information is used to indicate that the terminal supports the system bandwidth. The capability information includes one or more of bandwidth that can be supported by the terminal and a system parameter set. The system parameter set includes one or more of parameters such as a size of a subcarrier spacing, a length of a cyclic prefix, a length of a transmission time interval, a length of a symbol, and a quantity of symbols.

According to a sixth aspect, this application provides a communication method, including:

sending, by a network device, DCI to a terminal, where the DCI includes configuration information, and the configuration information is used to indicate system bandwidth; and communicating, by the network device, with the terminal by using the system bandwidth.

The network device may determine the system bandwidth based on a quantity of data services. For example, when there are a relatively small quantity of data services in a network, relatively small system bandwidth is used; when there are a relatively large quantity of data services in a network, relatively large system bandwidth is used. The network device may add the configuration information to the DCI and send the DCI to the terminal, to indicate the system bandwidth determined by the network device to the terminal. After determining the system bandwidth, the network device communicates with the terminal by using the determined system bandwidth.

In the communication method provided in the sixth aspect of this application, the network device sends the DCI to the terminal. The DCI includes the configuration information, and the configuration information is used to indicate the system bandwidth. The network device communicates with the terminal by using the system bandwidth. Because the network device indicates the available system bandwidth to the terminal, and communicates with the terminal by using the system bandwidth, the system bandwidth can be determined more flexibly.

Optionally, the method further includes: sending capability information. The capability information is used to indicate that the terminal supports the system bandwidth.

Specifically, the terminal may report the capability information of the terminal by using an initial access preamble (a message 1) or a message 3. The network device determines, based on the capability information reported by the terminal, whether to flexibly configure bandwidth based on the quantity of data services, to determine a size of the system bandwidth. The capability information is used to indicate that the terminal supports the system bandwidth. The capability information includes one or more of bandwidth that can be supported by the terminal and a system parameter set. The system parameter set includes one or more of parameters such as a size of a subcarrier spacing, a length of a cyclic prefix, a length of a transmission time interval, a length of a symbol, and a quantity of symbols.

According to a seventh aspect, an embodiment of this application provides a communications apparatus. The apparatus includes a module or means (means) configured to perform the method provided in the first aspect and the implementations of the first aspect.

According to an eighth aspect, an embodiment of this application provides a communications apparatus. The apparatus includes a module or means (means) configured to perform the method provided in the second aspect and the implementations of the second aspect.

According to a ninth aspect, an embodiment of this application provides a communications apparatus. The apparatus includes a module or means (means) configured to perform the method provided in the third aspect and the implementations of the third aspect.

According to a tenth aspect, an embodiment of this application provides a communications apparatus. The apparatus includes a module or means (means) configured to perform the method provided in the fourth aspect and the implementations of the fourth aspect.

According to an eleventh aspect, an embodiment of this application provides a communications apparatus. The apparatus includes a module or means (means) configured to perform the method provided in the fifth aspect and the implementations of the fifth aspect.

According to a twelfth aspect, an embodiment of this application provides a communications apparatus. The apparatus includes a module or means (means) configured to perform the method provided in the sixth aspect and the implementations of the sixth aspect.

According to a thirteenth aspect, an embodiment of this application provides a communications apparatus. The apparatus includes a processor and a memory. The memory is configured to store a program. The processor invokes the program stored in the memory, to perform the method provided in the first aspect of this application.

According to a fourteenth aspect, an embodiment of this application provides a communications apparatus. The apparatus includes a processor and a memory. The memory is configured to store a program. The processor invokes the program stored in the memory, to perform the method provided in the second aspect of this application.

According to a fifteenth aspect, an embodiment of this application provides a communications apparatus. The apparatus includes a processor and a memory. The memory is configured to store a program. The processor invokes the program stored in the memory, to perform the method provided in the third aspect of this application.

According to a sixteenth aspect, an embodiment of this application provides a communications apparatus. The apparatus includes a processor and a memory. The memory is configured to store a program. The processor invokes the program stored in the memory, to perform the method provided in the fourth aspect of this application.

According to a seventeenth aspect, an embodiment of this application provides a communications apparatus. The apparatus includes a processor and a memory. The memory is configured to store a program. The processor invokes the program stored in the memory, to perform the method provided in the fifth aspect of this application.

According to an eighteenth aspect, an embodiment of this application provides a communications apparatus. The apparatus includes a processor and a memory. The memory is configured to store a program. The processor invokes the program stored in the memory, to perform the method provided in the sixth aspect of this application.

According to a nineteenth aspect, an embodiment of this application provides a communications apparatus, including at least one processing element (or chip) configured to perform the method in the first aspect.

According to a twentieth aspect, an embodiment of this application provides a communications apparatus, including at least one processing element (or chip) configured to perform the method in the second aspect.

According to a twenty-first aspect, an embodiment of this application provides a communications apparatus, including at least one processing element (or chip) configured to perform the method in the third aspect.

According to a twenty-second aspect, an embodiment of this application provides a communications apparatus, including at least one processing element (or chip) configured to perform the method in the fourth aspect.

According to a twenty-third aspect, an embodiment of this application provides a communications apparatus, including at least one processing element (or chip) configured to perform the method in the fifth aspect.

According to a twenty-fourth aspect, an embodiment of this application provides a communications apparatus, including at least one processing element (or chip) configured to perform the method in the sixth aspect.

According to a twenty-fifth aspect, an embodiment of this application provides a communication program. When executed by a processor, the program is configured to perform the method in the first aspect.

According to a twenty-sixth aspect, an embodiment of this application provides a program product, for example, a computer-readable storage medium, including the program in the twenty-fifth aspect.

According to a twenty-seventh aspect, an embodiment of this application provides a communication program. When executed by a processor, the program is configured to perform the method in the second aspect.

According to a twenty-eighth aspect, an embodiment of this application provides a program product, for example, a computer-readable storage medium, including the program in the twenty-seventh aspect.

According to a twenty-ninth aspect, an embodiment of this application provides a communication program. When executed by a processor, the program is configured to perform the method in the third aspect.

According to a thirtieth aspect, an embodiment of this application provides a program product, for example, a computer-readable storage medium, including the program in the twenty-ninth aspect.

According to a thirty-first aspect, an embodiment of this application provides a communication program. When executed by a processor, the program is configured to perform the method in the fourth aspect.

According to a thirty-second aspect, an embodiment of this application provides a program product, for example, a computer-readable storage medium, including the program in the thirty-first aspect.

According to a thirty-third aspect, an embodiment of this application provides a communication program. When executed by a processor, the program is configured to perform the method in the fifth aspect.

According to a thirty-fourth aspect, an embodiment of this application provides a program product, for example, a computer-readable storage medium, including the program in the thirty-third aspect.

According to a thirty-fifth aspect, an embodiment of this application provides a communication program. When executed by a processor, the program is configured to perform the method in the sixth aspect.

According to a thirty-sixth aspect, an embodiment of this application provides a program product, for example, a computer-readable storage medium, including the program in the thirty-fifth aspect.

In the first aspect, the terminal receives the configuration information sent by the network device, and receives the common control information on the resource indicated by the configuration information. The configuration information is used to indicate the resource in the plurality of candidate resources of the common search space, and the candidate resources of the common search space are determined based on one or more of the cell identity, the downlink bandwidth, the frequency domain resource location of the synchronization channel, and the frequency domain resource location of the broadcast channel. Because the network device determines the candidate resources of the common search space based on one or more of the cell identity, the downlink bandwidth, the frequency domain resource location of the synchronization channel, and the frequency domain resource location of the broadcast channel, and enables the terminal to receive the common control information on the resource indicated by the configuration information, a manner of determining the common search space can be more flexible.

In the second aspect, the network device sends the configuration information, and sends the common control information on the resource indicated by the configuration information. The configuration information is used to indicate the resource in the plurality of candidate resources of the common search space, and the candidate resources of the common search space are determined based on one or more of the cell identity, the downlink bandwidth, the frequency domain resource location of the synchronization channel, and the frequency domain resource location of the broadcast channel. Because the network device determines the candidate resources of the common search space based on one or more of the cell identity, the downlink bandwidth, the frequency domain resource location of the synchronization channel, and the frequency domain resource location of the broadcast channel, and sends the common control information on the resource indicated by the configuration information, a manner of determining the common search space can be more flexible.

In the third aspect, the terminal receives the configuration information sent by the network device. The configuration information is used to indicate the frequency domain resource start value of the physical channel, and the physical channel is used to indicate the format of the transmission unit and/or used to indicate the quantity of symbols in the physical downlink control region in the transmission unit. The terminal receives the physical channel on the resource indicated by the frequency domain resource start value. Because the network device sends, to the terminal, the configuration information used to indicate the frequency domain resource start value of the physical channel, and the terminal receives the physical channel on the resource indicated by the frequency domain resource start value, the physical channel can be configured more flexibly.

In the fourth aspect, the network device sends the configuration information. The configuration information is used to indicate the frequency domain resource start value of the physical channel, and the physical channel is used to indicate the format of the transmission unit and/or used to indicate the quantity of symbols in the physical downlink control region in the transmission unit. The network device sends the physical channel on the resource indicated by the frequency domain resource start value. Because the network device sends, to the terminal, the configuration information used to indicate the frequency domain resource start value of the physical channel, and sends the physical channel on the resource indicated by the frequency domain resource start value, the physical channel can be configured more flexibly.

In the fifth aspect, the terminal receives the DCI sent by the network device. The DCI includes the configuration information, and the configuration information is used to indicate the system bandwidth. The terminal communicates by using the system bandwidth. Because the network device indicates the available system bandwidth to the terminal, and the terminal communicates based on the system bandwidth indicated by the network device, the system bandwidth can be determined more flexibly.

In the sixth aspect, the network device sends the DCI to the terminal. The DCI includes the configuration information, and the configuration information is used to indicate the system bandwidth. The network device communicates with the terminal by using the system bandwidth. Because the network device indicates the available system bandwidth to the terminal, and communicates with the terminal by using the system bandwidth, the system bandwidth can be determined more flexibly.

DESCRIPTION OF EMBODIMENTS

The following explains some terms in this application for ease of understanding for a person skilled in the art.

(1) A terminal, also referred to as user equipment (User Equipment, UE), is a device that provides voice and/or data connectivity for a user, for example, a handheld device or an in-vehicle device having a wireless connection function. Common terminals include, for example, a mobile phone, a tablet computer, a notebook computer, a palmtop computer, a mobile Internet device (mobile internet device, MID), a wearable device such as a smartwatch or a smart band, and a pedometer.

(2) A network device, also referred to as a radio access network (Radio Access Network, RAN) device, is a device that connects the terminal to a wireless network, and includes base stations in various communications standards. For example, the base stations include but are not limited to, a transmission/reception point (Transmission/Reception Point, TRP), an evolved NodeB (evolved NodeB, eNB), a radio network controller (radio network controller, RNC), a NodeB (NodeB, NB), a base station controller (Base Station Controller, BSC), a base transceiver station (Base Transceiver Station, BTS), a home base station (for example, Home evolved NodeB, or Home NodeB, HNB), a baseband unit (BaseBand Unit, BBU), or a Wi-Fi access point (Access Point, AP).

(3) A unit in this application is a function unit or a logical unit. The unit may be in a form of software, and a function of the unit is implemented by a processor by executing program code. Alternatively, the unit may be in a form of hardware.

(4) The term "a/the plurality of" means two or more than two. Another quantifier is similar thereto. The term "and/or" describes an association relationship between associated objects and represents that three relationships may exist. For example, A and/or B may represent the following three cases: Only A exists, both A and B exist, and only B exists. The character "/" generally indicates an "or" relationship between associated objects. A range described by "above", "below", or the like includes a boundary point.

Figure 1:
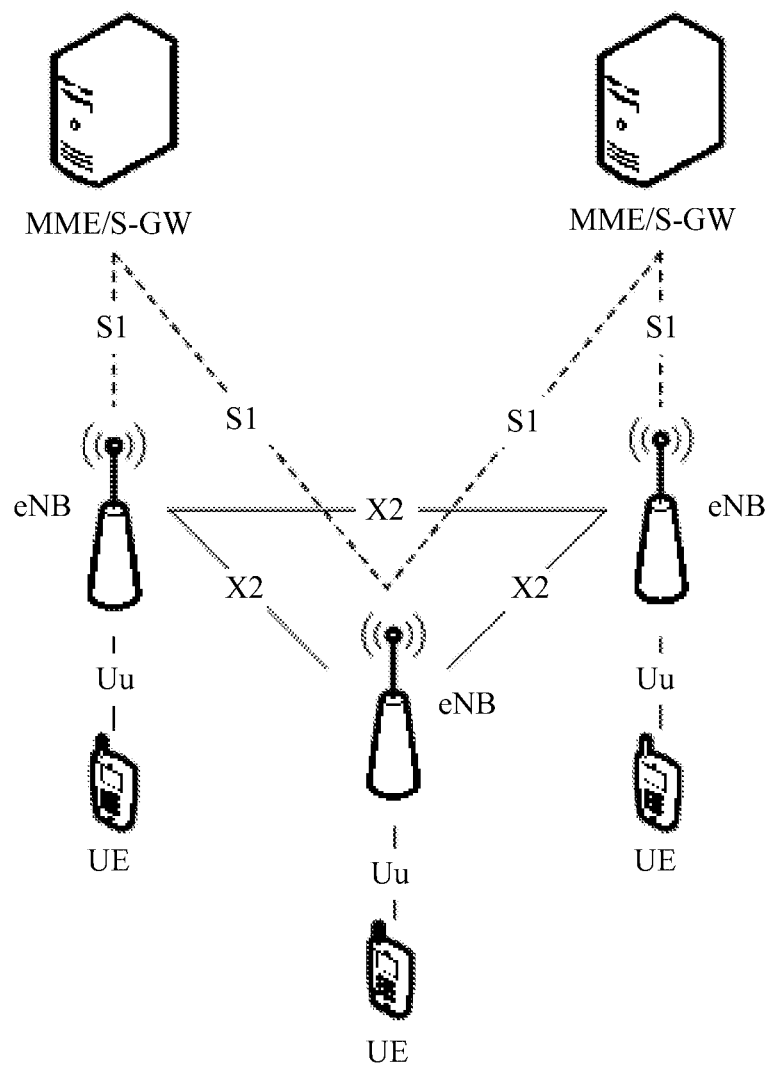
FIG. 1 is an architectural diagram of an LTE system.

A communication method provided in embodiments of this application may be applied to a Long Term Evolution (Long Term Evolution, LTE)/5th generation (5th Generation, 5G) network. FIG. 1 is an architectural diagram of an LTE system. As shown in FIG. 1, the system includes a mobility management entity (Mobility Management Entity, MME)/a serving gateway (Serving GateWay, S-GW), an evolved NodeB (evolved NodeB, eNB), and a terminal. The terminal may be, for example, UE. The MME is a key control node in 3rd Generation Partnership Project (3rd Generation Partnership Project, 3GPP) LTE and is a network element of a core network, and is mainly responsible for a signaling processing part, that is, control plane functions, including functions such as access control, mobility management, attachment and detachment, session management, and gateway selection. The S-GW is an important network element of the core network in 3GPP LTE, and is mainly responsible for a user plane function of user data forwarding, that is, data packet routing and forwarding under control of the MME. The eNB is a base station in LTE, and is mainly responsible for air interface side functions such as radio resource management, quality of service (Quality of Service, QoS) management, and data compression and encryption. In addition, the eNB is further responsible for forwarding control plane signaling to the MME and forwarding user plane service data to the S-GW. The UE is a device in LTE that accesses a network side by using the eNB, and may be, for example, a handheld terminal, a notebook computer, or another device that can access a network. In addition, an S1 interface is a standard interface between the eNB and the core network. The eNB is connected to the MME through an S1-MME interface, to transmit control signaling. The eNB is connected to the S-GW through an S1-U interface, to transmit user data. The S1-MME interface and the S1-U interface are collectively referred to as the S1 interface. An X2 interface is a standard interface between eNBs, and is configured to implement communication between the base stations. A Uu interface is a radio interface between the UE and the base station. The UE accesses an LTE network through the Uu interface.

Based on the system architecture shown in FIG. 1, the UE listens to a physical downlink control channel (Physical Downlink Control Channel, PDCCH)/enhanced physical downlink control channel (Enhanced Physical Downlink Control Channel, EPDCCH) candidate set during non-discontinuous reception (non-Discontinuous Reception, non-DRX) in subframes. Therefore, the UE needs to attempt to decode each PDCCH/EPDCCH in the set based on a format of downlink control information (Downlink Control Information, DCI) obtained through listening. The set is referred to as a search space (Search Space) of the UE. The PDCCH includes a common search space (Common Search Space, CSS) and a UE-specific search space (UE-specific Search Space, USS). In the prior art, a control channel element (Control Channel Element, CCE) occupied by a PDCCH candidate m in a search space $S_k^{(L)}$ is usually calculated by using a formula $L*\{(Y_k+m) \bmod \lfloor N_{CCE,k}/L \rfloor\}+i$. $i=0, \ldots, L-1$, $m=0, \ldots, m^{(L)}-1$, and $M^{(L)}$ is a quantity of PDCCH candidates to which the UE needs to listen in the given search space. When the common search space is determined in such a manner, the common search space generally starts from a CCE 0. In other words, for the common search space, $Y_k=0$. Therefore, the common search space fixedly occupies the first 16 CCEs of the PDCCH, and determining of the common search space is inflexible.

In view of this, the embodiments of this application provide a communication method. A terminal receives configuration information sent by a network device, and receives common control information on a resource indicated by the configuration information. The configuration information is used to indicate the resource in a plurality of candidate resources of a common search space, and the candidate resources of the common search space are determined based on one or more of a cell identity, downlink bandwidth, a frequency domain resource location of a synchronization channel, and a frequency domain resource location of a broadcast channel. Because the network device determines the candidate resources of the common search space based on one or more of the cell identity, the downlink bandwidth, the frequency domain resource location of the synchronization channel, and the frequency domain resource location of the broadcast channel, and enables the terminal to receive the common control information on the resource indicated by the configuration information, a manner of determining the common search space can be more flexible.

Figure 2:
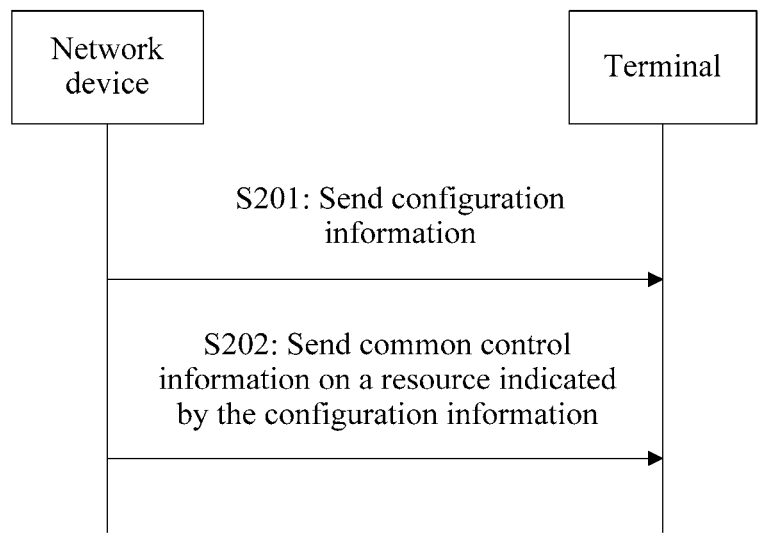
FIG. 2 is a signaling flowchart of Embodiment 1 of a communication method according to this application.

FIG. 2 is a signaling flowchart of Embodiment 1 of a communication method according to this application. Based on the system architecture shown in FIG. 1, as shown in FIG. 2, the method in this embodiment may include the following steps.

Step 201: A terminal receives configuration information sent by a network device. The configuration information is used to indicate a resource in a plurality of candidate resources of a common search space, and the candidate resources of the common search space are determined based on one or more of a cell identity, downlink bandwidth, a frequency domain resource location of a synchronization channel, and a frequency domain resource location of a broadcast channel.

In this embodiment, the cell identity may be an identity that is semi-statically or statically configured for a cell, for example, may be a PCI. Certainly, the cell identity may alternatively be determined in another manner. For example, when two cells are geographically close and reference signals from the two cells are quasi-co-located (Quasi-Co-Located, QCL), the two cells may use a same common cell identity. In this case, that reference signals are QCL indicates that the reference signals are similar in at least one large-scale fading characteristic in information such as a Doppler shift, a Doppler spread, an average delay, or a time domain spread. Therefore, the cell identity may alternatively be determined depending on a result of negotiation between network devices. After obtaining the cell identity through negotiation, the network devices may deliver the cell identity obtained after negotiation to terminals in cells by using physical layer signaling, broadcast signaling, or higher layer signaling.

In addition, the downlink bandwidth may be subband bandwidth of predefined bandwidth, or may be full system bandwidth. A specific form of the downlink bandwidth is not limited herein in this embodiment.

The following describes in detail how the network device determines the candidate resources of the common search space based on one or more of the cell identity, the downlink bandwidth, the frequency domain resource location of the synchronization channel, and the frequency domain resource location of the broadcast channel.

In an optional implementation, a frequency domain resource start physical resource block (Physical Resource Block, PRB) of candidate resources of an $m^{th}$ common search space may be calculated based on formula (1):

$$k=\bar{k}+\lfloor(m-1)*N_{ss}^{DL}/M\rfloor*N_{RB}^{ss} \quad (1)$$

where k is the frequency domain resource start PRB of the candidate resources of the $m^{th}$ common search space, M is a quantity of the candidate resources of the common search space, $\bar{k}=(N_{RB}^{ss}/2)*(n_{ID}^{cell} \mod 2*N_{ss}^{DL})$, $N_{ss}^{DL}=\tilde{N}_{RB}^{DL}/N_{RB}^{ss}$, $N_{RB}^{ss}$ is frequency domain bandwidth occupied by the common search space, $\tilde{N}_{RB}^{DL}$ is downlink bandwidth, and $n_{ID}^{cell}$ is a cell identity.

Figure 3:
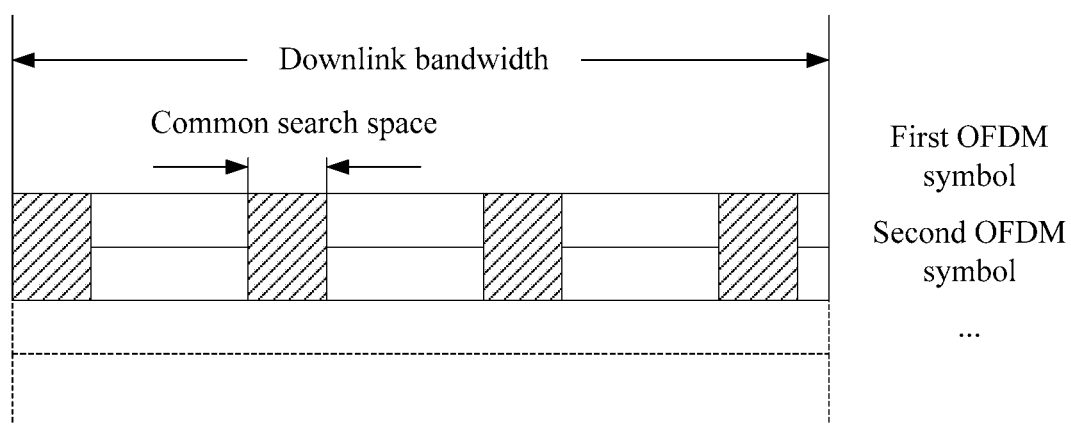
FIG. 3 is a schematic diagram 1 of resource mapping of a common search space.

For example, FIG. 3 is a schematic diagram 1 of resource mapping of a common search space. As shown in FIG. 3, it is assumed that a network has four common search spaces s(0), . . . , s(3) in total, frequency domain bandwidth occupied by each of the common search spaces is $N_{RB}^{ss}$, and $N_{ss}^{DL}=\tilde{N}_{RB}^{DL}/N_{RB}^{ss}$. Then, frequency domain resource start PRBs of candidate resources of the common search spaces s(0), . . . , s(3) may be calculated based on formula (2) to formula (5):

$$k=\bar{k}=(N_{RB}^{ss}/2)*(n_{ID}^{cell} \mod 2N_{ss}^{DL}) \quad (2)$$

$$k=\bar{k}+\lfloor N_{ss}^{DL}/4\rfloor*N_{RB}^{ss} \quad (3)$$

$$k=\bar{k}+\lfloor 2N_{ss}^{DL}/4\rfloor*N_{RB}^{ss} \quad (4)$$

$$k=\bar{k}+\lfloor 3N_{ss}^{DL}/4\rfloor*N_{RB}^{ss} \quad (5)$$

It can be learned from formula (2) to formula (5) that $\lfloor N_{ss}^{DL}/4\rfloor$ is about ¼ of downlink bandwidth. In other words, adjacent common search spaces are spaced in frequency domain by about ¼ of the downlink bandwidth. In addition, because a location of a common search space is related to a cell identity and the downlink bandwidth, a proper cell identity may be selected to avoid interference between transmission in common search spaces of neighboring cells.

In another optional implementation, a frequency domain resource start PRB of candidate resources of an $m^{th}$ common search space may be calculated based on formula (6):

$$k = \begin{cases} \bar{k} - \lfloor(|2m-M|+1)\rfloor*N_{ss}^{DL}/2M*N_{RB}^{ss}, m < M/2 \\ \bar{k} + \lfloor(|2m-M|+1)\rfloor*N_{ss}^{DL}/2M*N_{RB}^{ss}, m > M/2 \end{cases} \quad (6)$$

where k is the frequency domain resource start PRB of the candidate resources of the $m^{th}$ common search space, M is a quantity of the candidate resources of the common search space, when M is an even number, $\bar{k}=I_{syn}$, when M is an odd number, $\bar{k}=I_{syn}-N_{RB}^{ss}/2$, $I_{syn}$ is a center PRB index corresponding to a synchronization signal block, $N_{ss}^{DL}=\tilde{N}_{RB}^{DL}/N_{RB}^{ss}$, $N_{RB}^{ss}$ is frequency domain bandwidth occupied by the common search space, and $\tilde{N}_{RB}^{DL}$ is downlink bandwidth.

Figure 4:
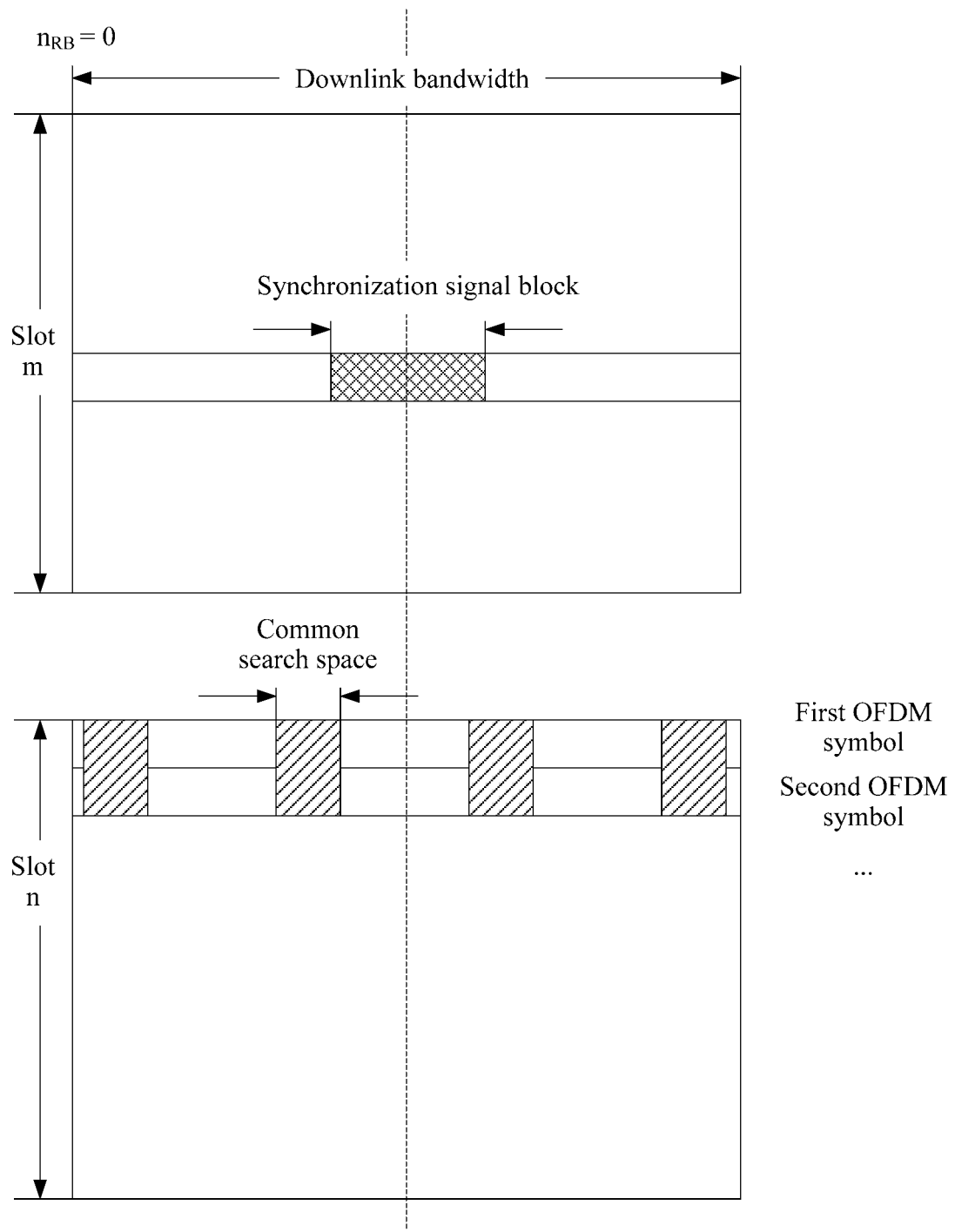
FIG. 4 is a schematic diagram 2 of resource mapping of a common search space.

For example, FIG. 4 is a schematic diagram 2 of resource mapping of a common search space. As shown in FIG. 4, it is assumed that a network has four common search spaces s(0), . . . , s(3) in total, and $I_{syn}$ is a center PRB index corresponding to a synchronization signal block. Then, frequency domain resource start PRBs of candidate resources of the common search spaces s(0), . . . , s(3) may be calculated based on formula (7) to formula (10):

$$k=I_{syn}-\lfloor 3N_{ss}^{DL}/8\rfloor*N_{RB}^{ss} \quad (7)$$

$$k=I_{syn}-\lfloor N_{ss}^{DL}/8\rfloor*N_{RB}^{ss} \quad (8)$$

$$k=I_{syn}+\lfloor N_{ss}^{DL}/8\rfloor*N_{RB}^{ss} \quad (9)$$

$$k=I_{syn}+\lfloor 3N_{ss}^{DL}/8\rfloor*N_{RB}^{ss} \quad (10)$$

In addition, when a frequency domain resource start PRB of candidate resources of a common search space is calculated by using formula (6), because the common search space may be configured in common signal resource bandwidth, the terminal may detect a synchronization signal, a broadcast signal, or the common search space in the common signal resource bandwidth, so that signaling overheads of the terminal can be reduced.

Certainly, the network device may alternatively determine the candidate resources of the common search space in another manner. For example, it is assumed that a network has four common search spaces s(0), . . . , s(3) in total, and $I_{syn}$ is a center PRB index corresponding to a synchronization signal block. Then, frequency domain resource start PRBs of candidate resources of the common search spaces s(0), . . . , s(3) may be calculated based on formula (11) to formula (14):

$$k=I_{syn}\pm\bar{k}-\lfloor 3N_{ss}^{DL}/8\rfloor*N_{RB}^{ss} \quad (11)$$

$$k=I_{syn}\pm\bar{k}-\lfloor N_{ss}^{DL}/8\rfloor*N_{RB}^{ss} \quad (12)$$

$$k=I_{syn}\pm\bar{k}+\lfloor N_{ss}^{DL}/8\rfloor*N_{RB}^{ss} \quad (13)$$

$$k=I_{syn}\pm\bar{k}+\lfloor 3N_{ss}^{DL}/8\rfloor*N_{RB}^{ss} \quad (14)$$

where $\bar{k}=(N_{RB}^{ss}/2)*(n_{ID}^{cell} \mod 2*N_{ss}^{DL})$, and $N_{ss}^{DL}=\tilde{N}_{RB}^{DL}/N_{RB}^{ss}$.

Optionally, that a terminal receives configuration information sent by a network device includes the following: The terminal receives a master system information block (Master System Information Block, MIB) message sent by the network device. The MIB message includes the configuration information.

Specifically, after determining the configuration information used to indicate the resource in the plurality of candidate resources of the common search space, the network device may add the configuration information to the MIB message and send the MIB message to the terminal. During actual application, the network device may indicate the configuration information by using a css-Config field of the MIB. In a specific implementation process, the following manner may be used for implementation:

| MasterInformationBlock ::= | SEQUENCE { |
|---|---|
| dl-Bandwidth | ENUMERATED { |
| | n6, n15, n25, n50, n75, n100}, |
| ... ... | |
| css-Config | CSS-Config,    ------CSS |
| configuration | |
| ... ... | |
| } | |
| CSS-Config ::= | SEQUENCE { |
| css-Resource | ENUMERATED {00, 01, 10, 11}------ |
| resources of a configured CSS | |
| } | | where a value "00" of css-Resource indicates that candidate resources of the configured common search space are s(0), a value "01" of css-Resource indicates that a resource subset of the configured common search space is s(1), and so on.

In addition, when indicating the configuration information by using the MIB message, the network device indicates the configuration information by using a css-Config field having a length of $\log_2 M$ in the MIB. M is a quantity of the candidate resources of the common search space.

Step 202: The network device sends common control information on the resource indicated by the configuration information.

In this embodiment, after determining the plurality of candidate resources of the common search space, the network device selects one or more resources from the plurality of candidate resources, and indicates the one or more resources to the terminal by using the MIB. In addition, the network device sends the common control information on the resource indicated by the configuration information.

Optionally, the common control information includes configuration information of at least one of a SIB, an RAR, and a paging paging message.

Optionally, the configuration information includes indexes of the candidate resources.

Optionally, the configuration information is used to indicate a frequency domain resource start value of the resource. The frequency domain resource start value is a frequency domain resource start location or a frequency domain resource offset, for example, may be a lowest PRB index.

Optionally, the common control information includes DCI, and the DCI is used to indicate a format of a transmission unit and/or used to indicate a quantity of symbols in a physical downlink control region in the transmission unit.

Specifically, the transmission unit is of a time domain structure, and may be a subframe, a slot, a mini-slot, an aggregated slot, an aggregated mini-slot, or the like. The format of the transmission unit is how a downlink control region, a downlink data region, an uplink data region, and an uplink control region in the transmission unit are arranged. The format of the transmission unit may include one or more of the following: (1) all-downlink: including a downlink control region and a downlink data region, or including only a downlink data region; (2) downlink-dominant: including a downlink control region, a downlink data region, and an uplink control region, or including a downlink data region and an uplink control region; (3) uplink-dominant: including a downlink control region, an uplink data region, and an uplink control region, or including a downlink control region and an uplink data region; and (4) all-uplink: including an uplink data region and an uplink control region, or including only an uplink data region, or including only an uplink control region.

In addition, the following several cases may occur for the DCI used to indicate the format of the transmission unit and/or used to indicate the quantity of symbols in the physical downlink control region in the transmission unit: (1) the DCI is used to indicate only the format of the transmission unit; (2) the DCI is used to indicate only the quantity of symbols in the physical downlink control region in the transmission unit; and (3) the DCI is used to indicate the format of the transmission unit and used to indicate the quantity of symbols in the physical downlink control region in the transmission unit.

Optionally, the common control information includes the DCI, the DCI includes configuration information, and the configuration information is used to indicate system bandwidth.

Specifically, the network device may determine the system bandwidth based on a quantity of data services in a network. For example, when there are a relatively small quantity of data services in the network, relatively small system bandwidth is used; when there are a relatively large quantity of data services in the network, relatively large system bandwidth is used. After determining the system bandwidth, the network device adds, to the DCI, the configuration information used to indicate the system bandwidth and sends the DCI to the terminal. After receiving the system bandwidth indicated by the network device, the terminal communicates by using the system bandwidth, for example, receives data and control information on the system bandwidth. Because the network device may determine the system bandwidth based on the quantity of data services in the network, the system bandwidth can be determined more flexibly.

In the communication method provided in this embodiment of this application, the terminal receives the configuration information sent by the network device, and receives the common control information on the resource indicated by the configuration information. The configuration information is used to indicate the resource in the plurality of candidate resources of the common search space, and the candidate resources of the common search space are determined based on one or more of the cell identity, the downlink bandwidth, the frequency domain resource location of the synchronization channel, and the frequency domain resource location of the broadcast channel. Because the network device determines the candidate resources of the common search space based on one or more of the cell identity, the downlink bandwidth, the frequency domain resource location of the synchronization channel, and the frequency domain resource location of the broadcast channel, and enables the terminal to receive the common control information on the resource indicated by the configuration information, a manner of determining the common search space can be more flexible.

Based on the system architecture shown in FIG. 1, in the prior art, information carried on a physical control format indicator channel (Physical Control Format Indicator Channel, PCFICH) is a control format indicator (Control Format Indicator, CFI), and the CFI has a value range of 1 to 3 (in other words, CFI=1, 2, or 3; the CFI is indicated by using two bits, and CFI=4 is reserved and unused). For downlink system bandwidth $N_{RB}^{DL} \geq 10$, a quantity of orthogonal frequency division multiplexing (Orthogonal Frequency Division Multiplexing, OFDM) symbols occupied by a control region is 1 (CFI=1), 2 (CFI=2), or 3 (CFI=3), that is, is equal to the CFI. For downlink system bandwidth $N_{RB}^{DL}<10$, a quantity of OFDM symbols occupied by a control region is 2 (CFI=1), 3 (CFI=2), or 4 (CFI=3), that is, is equal to CFI+1. A physical layer processing process of the PCFICH is as follows: first, performing channel coding with a code rate of 1/16 on the 2-bit CFI, to obtain a 32-bit codeword; next, scrambling the 32-bit codeword by using a scrambling code that is specific to a cell and a subframe, to randomize interference between cells; and then, performing quadrature phase shift keying (Quadrature Phase Shift Keying, QPSK) modulation on 32 scrambled bits obtained after scrambling, to obtain 16 modulated symbols, performing layer matching and precoding on the 16 modulated symbols, and mapping the 16 modulated symbols to corresponding resource elements (Resource Element, RE). Because the terminal can obtain a size of the control region only when the PCFICH is correctly decoded, the network device always sends the PCFICH in the first OFDM symbol of each subframe. In addition, the 16 modulated symbols of the PCFICH are grouped into four groups, each group occupies one resource element group (Resource Element Group, REG), each REG includes four REs that can be used for transmission, and the four REGs are evenly distributed in the entire downlink system bandwidth, to obtain a frequency diversity gain.

Information included in each REG is indicated by using formula (15):

$$z^{(p)}(i)=y^{(p)}(4i), y^{(p)}(4i+1), y^{(p)}(4i+2), y^{(p)}(4i+3) \quad (15)$$

where i represents an index of each REG, and has a value range of 0 to 3, and a location of a start RE of each REG is calculated by using formula (16):

$$k \%(N_{RB}^{DL} N_{sc}^{RB}) \quad (15)$$

where resource element groups to which $z^{(p)}(0)$ to $z^{(p)}(3)$ are mapped may be calculated based on formula (16) to formula (19):

$$k=\bar{k} \quad (16)$$

$$k=\bar{k}+\lfloor N_{RB}^{DL}/2 \rfloor * N_{sc}^{RB*}/2 \quad (17)$$

$$k=\bar{k}+\lfloor 2N_{RB}^{DL}/2 \rfloor N_{sc}^{RB*}/2 \quad (18)$$

$$k=\bar{k}+\lfloor 3N_{RB}^{DL}/2 \rfloor N_{sc}^{RB*}/2 \quad (19)$$

where $\bar{k}=(N_{sc}^{RB}/2)*(n_{ID}^{cell} \mod 2N_{RB}^{DL})$, $n_{ID}^{cell}$ is a cell identity, $N_{RB}^{DL}$ is system bandwidth, and $N_{sc}^{RB}$ is a quantity of carriers in a resource block.

It can be learned from the foregoing content that, in the prior art, for a given cell and given downlink system bandwidth, the PCFICH is mapped to a fixed resource, and PCFICH resource configuration is inflexible.

In view of this, the embodiments of this application provide a communication method. A terminal receives configuration information sent by a network device. The configuration information is used to indicate a frequency domain resource start value of a physical channel, and the physical channel is used to indicate a format of a transmission unit and/or used to indicate a quantity of symbols in a physical downlink control region in the transmission unit. The terminal receives the physical channel on a resource indicated by the frequency domain resource start value. Because the network device sends, to the terminal, the configuration information used to indicate the frequency domain resource start value of the physical channel, and the terminal receives the physical channel on the resource indicated by the frequency domain resource start value, the physical channel can be configured more flexibly.

Figure 5:
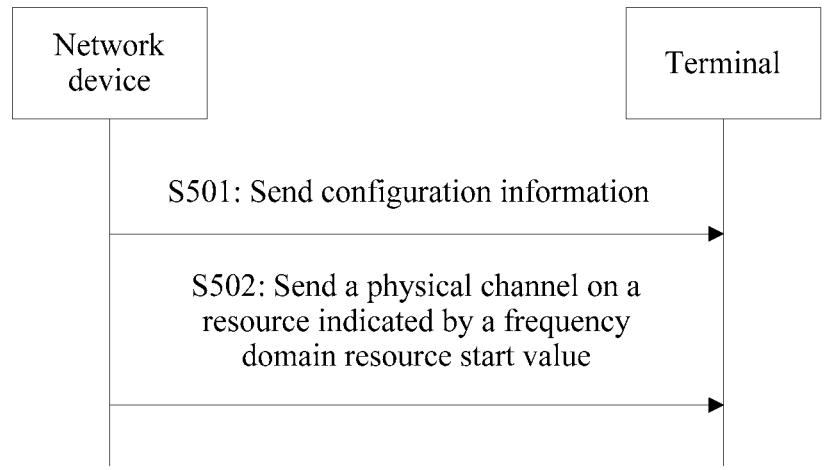
FIG. 5 is a signaling flowchart of Embodiment 2 of a communication method according to this application.

FIG. 5 is a signaling flowchart of Embodiment 2 of a communication method according to this application. Based on the system architecture shown in FIG. 1, as shown in FIG. 5, the method in this embodiment may include the following steps.

Step 501: A terminal receives configuration information sent by a network device. The configuration information is used to indicate a frequency domain resource start value of a physical channel, and the physical channel is used to indicate a format of a transmission unit and/or used to indicate a quantity of symbols in a physical downlink control region in the transmission unit.

In this embodiment, the physical channel may be a new physical downlink channel different from a physical downlink control channel (Physical Downlink Control Channel, PDCCH), or may be DCI. A specific form of the physical channel is not limited herein in this embodiment. The frequency domain resource start value is also referred to as a frequency domain resource offset or a frequency domain resource start location, for example, may be a lowest PRB index. In addition, the transmission unit is of a time domain structure, and may be a subframe, a slot, a mini-slot, an aggregated slot, an aggregated mini-slot, or the like.

The following describes in detail a specific process in which the network device determines the frequency domain resource start value of the physical channel.

Figure 6:
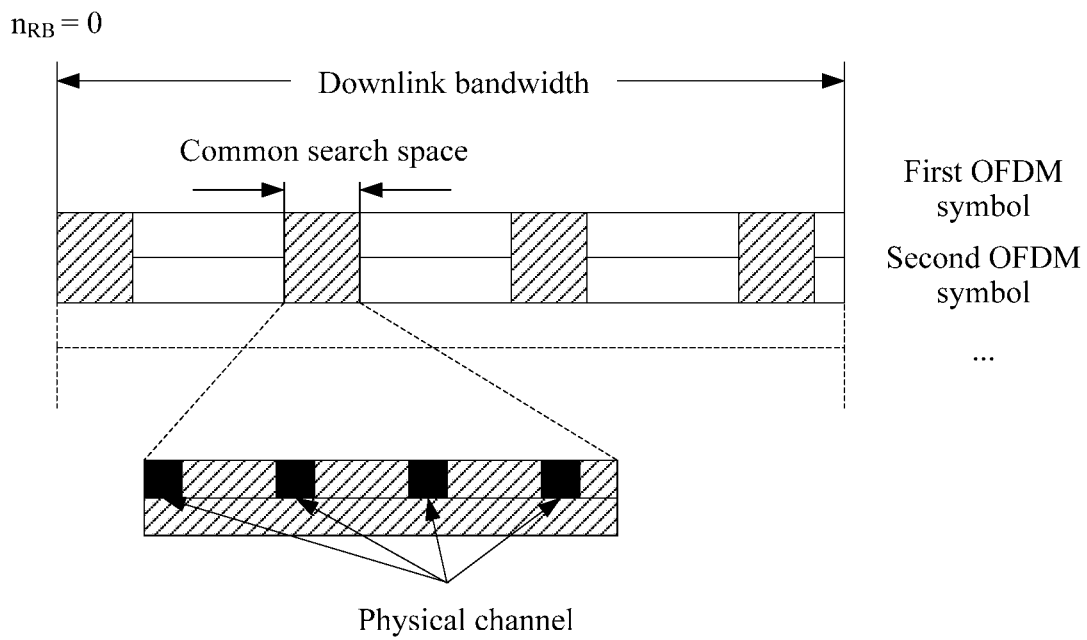
FIG. 6 is a schematic diagram of resource mapping of a physical channel.

FIG. 6 is a schematic diagram of resource mapping of a physical channel. As shown in FIG. 6, when the physical channel carries a relatively small quantity of information bits (for example, two bits), the network device sends, to the terminal, a frequency domain resource start value used to indicate the physical channel. In addition, 16 modulated symbols obtained by processing 2-bit indication information of a slot structure are grouped into four groups $z(0), \ldots, z(3)$ and evenly distributed in a frequency band in which a control resource subset is located. If $\bar{k}=(N_{sc}^{RB}/2)*(n_{ID}^{cell} \mod 2\tilde{N}_{RB}^{DL})$, frequency domain resource start values of $z(0), \ldots, z(3)$ are respectively calculated based on formula (20) to formula (23):

$$k=\bar{k}+N_{offset}N_{sc}^{RB} \quad (20)$$

$$k=\bar{k}+\lfloor N_{RB}^{ss}/2 \rfloor * N_{sc}^{RB}/2+N_{offset}N_{sc}^{RB} \quad (21)$$

$$k=\bar{k}+\lfloor 2N_{RB}^{ss}/2 \rfloor * N_{sc}^{RB}/2+N_{offset}N_{sc}^{RB} \quad (22)$$

$$k=\bar{k}+\lfloor 3N_{RB}^{ss}/2 \rfloor * N_{sc}^{RB}/2+N_{offset}N_{sc}^{RB} \quad (23)$$

where $N_{offset}$ is a frequency domain resource start value.

Optionally, that a terminal receives configuration information sent by a network device includes the following: The terminal receives broadcast signaling or higher layer signaling sent by the network device. The broadcast signaling or the higher layer signaling includes the configuration information.

Specifically, the broadcast signaling may be, for example, a MIB message. The higher layer signaling may be, for example, a SIB message or a user-specific RRC message. Because the network device sends the configuration information to the terminal by using the broadcast signaling or the higher layer signaling, some users may detect the configuration information.

Optionally, a frequency domain resource to which the physical channel is mapped is determined based on one or more of a cell identity and bandwidth that corresponds to a control resource subset. Specifically, the cell identity may be an identity that is semi-statically or statically configured for a cell, for example, may be a PCI. In addition, the control resource subset is subband bandwidth of predefined bandwidth.

Optionally, a time domain resource to which the physical channel is mapped is the first symbol of the transmission unit.

Optionally, the control resource subset is used to transmit common downlink control information, and the common downlink control information includes configuration information of at least one of a system message block SIB, a random access response RAR, and a paging message.

Optionally, the control resource subset is used to transmit user group-specific downlink control information and/or user-specific downlink control information. Specifically, the physical channel is mapped to a control resource subset in which a common search space/a user group-specific search space is located, so that a user can detect the physical channel when detecting the common search space. The common search space is used to transmit common downlink control information, and all users in a cell need to receive the common downlink control information. The user group-specific search space is used to transmit user group-specific downlink control information, and one or more users in a cell need to receive the user group-specific downlink control information.

In addition, the control resource subset may be used to transmit only the user group-specific downlink control information, or the control resource subset may be used to transmit only the user-specific downlink control information, or the control resource subset may be used to transmit the user group-specific downlink control information and the user-specific downlink control information.

Optionally, the frequency domain resource start value is a lowest PRB index corresponding to the control resource subset.

Optionally, mapping the physical channel to the resource includes: performing channel coding on an information bit corresponding to the physical channel; scrambling a coded bit, where the scrambling sequence is determined by using the cell identity and a transmission unit index; modulating a scrambled bit; and mapping a modulated symbol to the resource.

Specifically, a physical layer processing process of the physical channel includes: first performing channel coding with a code rate of 1/16 on the information bit corresponding to the physical channel, for example, the 2-bit indication information in a slot transmission unit, to obtain a 32-bit codeword; then scrambling the 32-bit codeword by using the scrambling sequence that is determined by using the cell identity and the transmission unit index; then performing QPSK modulation on a 32-bit scrambled codeword, to obtain 16 modulated symbols; and mapping the 16 modulated symbols to a frequency band in which the control resource subset is located.

Optionally, the resource is in resources corresponding to K predefined downlink CCEs on a downlink control channel.

Optionally, the K CCEs are the first K CCEs of the downlink control channel.

Specifically, to ensure that presence or absence of the physical channel has minimum impact on blind detection for a control channel by a user, the modulated symbols may be further centrally mapped to several predefined CCEs in the control resource subset as far as possible. For example, it is assumed that one CCE occupies four REGs. If the CCE is mapped to a single symbol, the 16 modulated symbols are mapped to two or four REGs in one predefined CCE in the control resource subset. If the CCE is mapped to a plurality of symbols (two symbols), the 16 modulated symbols are mapped to two REGs in one predefined CCE in the control resource subset, or separately mapped to the first two REGs in each of two predefined CCEs. It should be noted that, unless it is indicated to the terminal that a given transmission unit does not include the physical channel, a CCE corresponding to the physical channel generally does not include downlink control information.

Optionally, information corresponding to the physical channel is downlink control information, the downlink control information is carried on a downlink control channel, and the downlink control information is located in a common search space and/or a user group search space of the downlink control channel.

Optionally, the information corresponding to the physical channel is carried on L CCEs, L is a predefined quantity, a lowest CCE index of the L CCEs is predefined, and a quantity of candidate sets is 1.

Optionally, the lowest CCE index is an index of the first CCE of the common search space.

Optionally, the CCE index is an index of the first CCE of the user group search space.

Specifically, when the physical channel carries a relatively large quantity of information bits (for example, 25 bits), the physical channel is essentially common DCI or user group-specific DCI. In this case, to reduce complexity of blind detection by a user, the physical channel may be mapped to several predefined consecutive CCEs. The "predefined" herein means that both a CCE quantity and a CCE index are predefined. In other words, a start CCE used for the downlink control information that carries information is predefined, an aggregation level L is predefined, and a quantity of candidate sets is 1. For example, the 25-bit information is mapped to four CCEs in the control resource subset that start from the first CCE (it is assumed that an aggregation level is 4, a cyclic redundancy check (Cyclic Redundancy Check) has 24 bits, and QPSK modulation is performed).

Step 502: The network device sends the physical channel on a resource indicated by the frequency domain resource start value.

In this embodiment, after sending, to the terminal, the configuration information used to indicate the frequency domain resource start value of the physical channel, the network device sends the physical channel on the resource indicated by the frequency domain resource start value. After receiving the configuration information sent by the network device, the terminal receives the physical channel on the resource indicated by the frequency domain resource start value.

In addition, in this embodiment, the physical channel is configured in the frequency band in which the control resource subset is located. In this way, different from an existing PCFICH, the resource for the physical channel in this embodiment is only in the frequency band in which the control resource subset is located. Moreover, the frequency domain resource start value is semi-statically configured, and the semi-static frequency domain resource start value may be the same as a lowest PRB index of the frequency band in which the control resource subset is located, or may be a value independently configured.

In the communication method provided in this embodiment of this application, the terminal receives the configuration information sent by the network device. The configuration information is used to indicate the frequency domain resource start value of the physical channel, and the physical channel is used to indicate the format of the transmission unit and/or used to indicate the quantity of symbols in the physical downlink control region in the transmission unit. The terminal receives the physical channel on the resource indicated by the frequency domain resource start value. Because the network device sends, to the terminal, the configuration information used to indicate the frequency domain resource start value of the physical channel, and the terminal receives the physical channel on the resource indicated by the frequency domain resource start value, the physical channel can be configured more flexibly.

Figure 7:
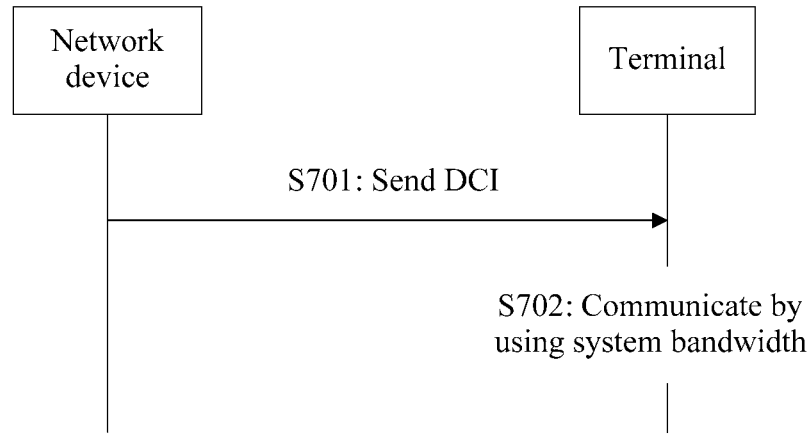
FIG. 7 is a signaling flowchart of Embodiment 3 of a communication method according to this application.

FIG. 7 is a signaling flowchart of Embodiment 3 of a communication method according to this application. Based on the system architecture shown in FIG. 1, as shown in FIG. 7, the method in this embodiment may include the following steps.

Step 701: A terminal receives DCI sent by a network device. The DCI includes configuration information, and the configuration information is used to indicate system bandwidth.

In this embodiment, the network device may determine the system bandwidth based on a quantity of data services. For example, when there are a relatively small quantity of data services in a network, relatively small system bandwidth is used; when there are a relatively large quantity of data services in a network, relatively large system bandwidth is used. The network device may add the configuration information to the DCI and send the DCI to the terminal, to indicate the system bandwidth determined by the network device to the terminal. In addition, after determining the system bandwidth, the network device communicates with the terminal in a next slot on the newly determined bandwidth, for example, sends data and control information on the new bandwidth.

In addition, the system bandwidth may be predefined as having several different sizes. For example, the system bandwidth may be predefined as having eight sizes shown in Table 1. In this case, selected system bandwidth may be indicated by DCI by using three bits.

TABLE 1

| | System bandwidth [MHz] | | | | | | | |
|---|---|---|---|---|---|---|---|---|
| | 1.4 | 3 | 5 | 10 | 15 | 20 | 40 | 80 |
| Quantity of RBs occupied by the system bandwidth (reference subcarrier spacing 15 KHz) | 6 | 15 | 25 | 50 | 75 | 100 | 200 | 400 |

Figure 8:
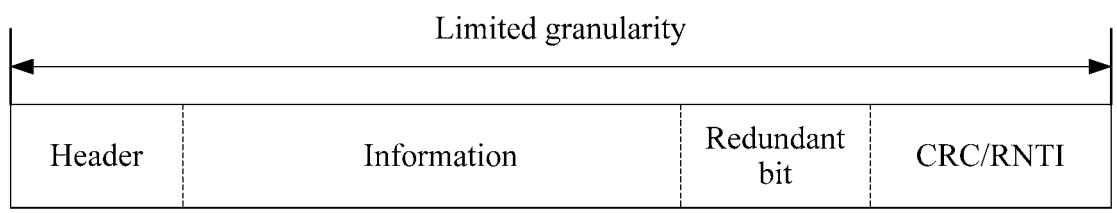
FIG. 8 is a schematic structural diagram of DCI.

Optionally, FIG. 8 is a schematic structural diagram of DCI. As shown in FIG. 8, a size of a limited granularity may be, for example, 30 bits, 60 bits, or 90 bits. If a value of a header is 00, it indicates downlink allocation. If the value of the header is 01, it indicates uplink grant. If the value of the header is 10, it indicates reconfiguration, or the like. Information may indicate resource allocation, a modulation and coding scheme (Modulation and Coding Scheme, MCS), a hybrid automatic repeat request (Hybrid Automatic Repeat reQuest, HARQ) parameter, or the like.

To reduce a quantity of times of blind detection for the DCI, NR supports several DCI payload sizes. To maintain a same DCI payload size, some redundant bits are required. In this case, the DCI may be carried by redundant bits of other common DCI.

Optionally, when in an RRC idle mode, UE needs to complete cell attachment through detection in a common search space. However, the common search space is configured depending on flexible downlink bandwidth. Therefore, the flexible downlink bandwidth needs to be indicated by using a MIB. According to discussion of 3GPP, currently, there are the following two possibilities:

First: A MIB includes only configuration information of first system bandwidth. During actual application, the following manner may be used for implementation:

```
    MasterInformationBlock ::=    SEQUENCE {
       dl-FlexBandwidth           ENUMERATED {
                                     n6, n15, n25, n50, n75, n100,
n200, n400},
       ... ...
    }
```

Second: A MIB includes configuration information of first system bandwidth and configuration information of second system bandwidth. The first system bandwidth and the second system bandwidth may be used to determine resources for different physical channels or physical signals. During actual application, the following manner may be used for implementation:

```
    MasterInformationBlock ::=    SEQUENCE {
       dl-Bandwidth               ENUMERATED {
                                     n6, n15, n25, n50, n75, n100,
n200, n400},
       dl_FlexBandwidth           ENUMERATED {
                                     n6, n15, n25, n50, n75, n100,
n200, n400},
       ... ...
    }
```

Optionally, the method further includes: sending capability information. The capability information is used to indicate that the terminal supports the system bandwidth.

Specifically, the terminal may report the capability information of the terminal by using an initial access preamble (a message 1) or a message 3. The network device determines, based on the capability information reported by the terminal, whether to flexibly configure bandwidth based on the quantity of data services, to determine a size of the system bandwidth. The capability information is used to indicate that the terminal supports the system bandwidth. The capability information includes one or more of bandwidth that can be supported by the terminal and a system parameter set. The system parameter set includes one or more of parameters such as a size of a subcarrier spacing, a length of a cyclic prefix, a length of a transmission time interval, a length of a symbol, and a quantity of symbols.

Step 702: The terminal communicates by using the system bandwidth.

In this embodiment, after receiving the configuration information that is sent by the network device and that is used to indicate the system bandwidth, the terminal communicates based on the system bandwidth indicated by the network device.

In the communication method provided in this embodiment of this application, the terminal receives the DCI sent by the network device. The DCI includes the configuration information, and the configuration information is used to indicate the system bandwidth. The terminal communicates by using the system bandwidth. Therefore, the system bandwidth can be determined more flexibly.

Figure 9:
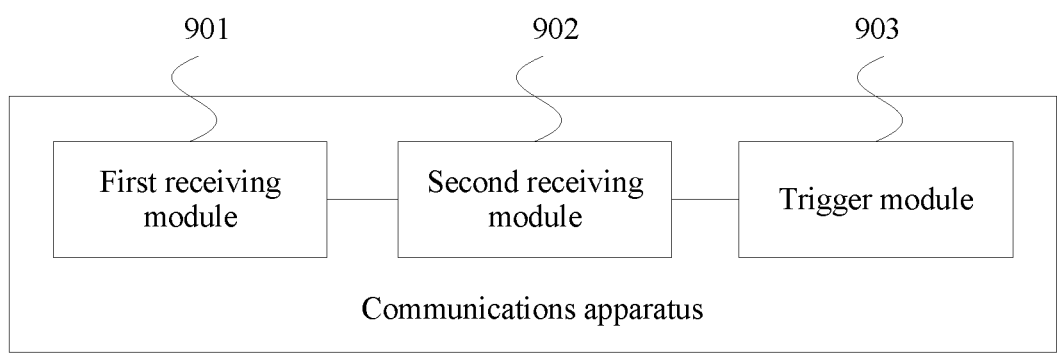
FIG. 9 is a schematic structural diagram of Embodiment 1 of a communications apparatus according to this application.

FIG. 9 is a schematic structural diagram of Embodiment 1 of a communications apparatus according to this application. The apparatus may be located on a terminal. Referring to FIG. 9, the apparatus includes: a first receiving module 901 and a second receiving module 902.

The first receiving module 901 is configured to receive configuration information sent by a network device. The configuration information is used to indicate a resource in a plurality of candidate resources of a common search space, and the candidate resources of the common search space are determined based on one or more of a cell identity, downlink bandwidth, a frequency domain resource location of a synchronization channel, and a frequency domain resource location of a broadcast channel.

The second receiving module 902 is configured to receive common control information on the resource indicated by the configuration information.

In this embodiment, the first receiving module 901 receives the configuration information sent by the network device, and the second receiving module 902 receives the common control information on the resource indicated by the configuration information. The configuration information is used to indicate the resource in the plurality of candidate resources of the common search space, and the candidate resources of the common search space are determined based on one or more of the cell identity, the downlink bandwidth, the frequency domain resource location of the synchronization channel, and the frequency domain resource location of the broadcast channel. Because the network device determines the candidate resources of the common search space based on one or more of the cell identity, the downlink bandwidth, the frequency domain resource location of the synchronization channel, and the frequency domain resource location of the broadcast channel, and enables the terminal to receive the common control information on the resource indicated by the configuration information, a manner of determining the common search space can be more flexible.

Further, the first receiving module 901 is configured to receive a master system information block MIB message sent by the network device. The MIB message includes the configuration information.

Optionally, the common control information includes configuration information of at least one of a system message block SIB, a random access response RAR, and a paging message.

Optionally, the configuration information includes indexes of the candidate resources.

Optionally, the configuration information is used to indicate a frequency domain resource start value of the resource.

Optionally, the common control information includes downlink control information DCI, and the DCI is used to indicate a format of a transmission unit and/or used to indicate a quantity of symbols in a physical downlink control region in the transmission unit.

Optionally, the common control information includes the downlink control information DCI, the DCI includes configuration information, and the configuration information is used to indicate system bandwidth.

Optionally, as shown in FIG. 9, the apparatus further includes a trigger module 903.

The trigger module 903 is configured to trigger the terminal to communicate by using the system bandwidth.

The foregoing apparatus may be configured to perform the method provided in the foregoing corresponding method embodiment. Specific implementations and technical effects of the apparatus are similar to those of the method. Details are not described herein again.

It should be understood that division of the modules of the foregoing communications apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the receiving module may be a processing element separately disposed, or may be integrated into a chip of the terminal. Alternatively, the receiving module may be stored in a memory of the terminal as a program that is invoked by a processing element of the terminal to perform a function of the receiving module. Implementation of another module is similar thereto. In addition, all or some of these modules may be integrated, or may be separately implemented. The processing element herein may be an integrated circuit having a signal processing capability. In an implementation process, the steps of the foregoing method or the foregoing modules may be completed by using a hardware-integrated logical circuit in a processor element or an instruction in a form of software. In addition, the receiving module is a receiving control module and may receive, by using a receiving apparatus such as an antenna and a radio frequency apparatus of the terminal, information sent by the base station.

The foregoing modules may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented by a processing element by scheduling a program, the processing element may be a general-purpose processor, for example, a central processing unit (Central Processing Unit, CPU) or another processor that can invoke a program. For another example, these modules may be integrated, and implemented in a system-on-a-chip (system-on-a-chip, SOC) form.

Figure 10:
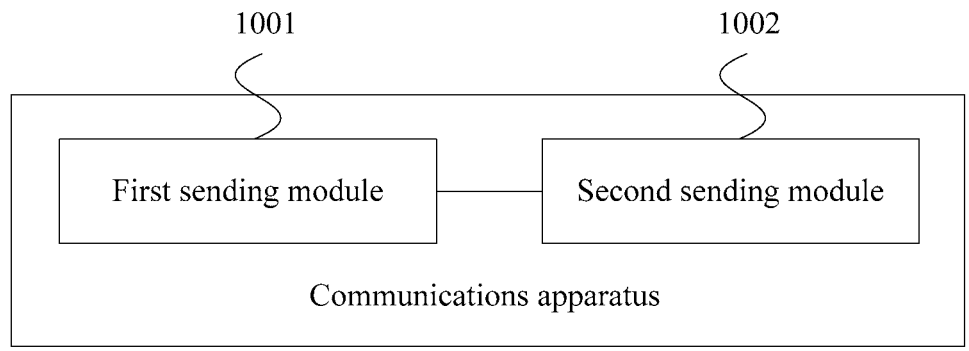
FIG. 10 is a schematic structural diagram of Embodiment 2 of a communications apparatus according to this application.

FIG. 10 is a schematic structural diagram of Embodiment 2 of a communications apparatus according to this application. The apparatus may be located on a network device. Referring to FIG. 10, the apparatus includes: a first sending module 1001 and a second sending module.

The first sending module 1001 is configured to send configuration information. The configuration information is used to indicate a resource in a plurality of candidate resources of a common search space, and the candidate resources of the common search space are determined based on one or more of a cell identity, downlink bandwidth, a frequency domain resource location of a synchronization channel, and a frequency domain resource location of a broadcast channel.

The second sending module 1002 is configured to send common control information on the resource indicated by the configuration information.

In this embodiment, the first sending module 1001 sends the configuration information. The configuration information is used to indicate the resource in the plurality of candidate resources of the common search space, and the candidate resources of the common search space are determined based on one or more of the cell identity, the downlink bandwidth, the frequency domain resource location of the synchronization channel, and the frequency domain resource location of the broadcast channel. The second sending module 1002 sends the common control information on the resource indicated by the configuration information. Because the network device determines the candidate resources of the common search space based on one or more of the cell identity, the downlink bandwidth, the frequency domain resource location of the synchronization channel, and the frequency domain resource location of the broadcast channel, and sends the common control information on the resource indicated by the configuration information, a manner of determining the common search space can be more flexible.

Optionally, the first sending module 1001 is configured to send a master system information block MIB message. The MIB message includes the configuration information.

Optionally, the common control information includes configuration information of at least one of a system message block SIB, a random access response RAR, and a paging message.

Optionally, the configuration information includes indexes of the candidate resources.

Optionally, the configuration information is used to indicate a frequency domain resource start value of the resource.

Optionally, the common control information includes downlink control information DCI, and the DCI is used to indicate a format of a transmission unit and/or used to indicate a quantity of symbols in a physical downlink control region in the transmission unit.

Optionally, the common control information includes the downlink control information DCI, the DCI includes configuration information, and the configuration information is used to indicate system bandwidth.

The foregoing apparatus may be configured to perform the method provided in the foregoing corresponding method embodiment. Specific implementations and technical effects of the apparatus are similar to those of the method. Details are not described herein again.

It should be understood that division of the modules of the foregoing communications apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the first sending module may be a processing element separately disposed, or may be integrated into a chip of the base station. Alternatively, the first sending module may be stored in a memory of the base station as a program that is invoked by a processing element of the base station to perform a function of the first sending module. Implementation of another module is similar thereto. In addition, all or some of these modules may be integrated, or may be separately implemented. The processing element herein may be an integrated circuit having a signal processing capability. In an implementation process, the steps of the foregoing method or the foregoing modules may be completed by using a hardware-integrated logical circuit in a processor element or an instruction in a form of software. In addition, the first sending module is a sending control module and may send information to a terminal by using a sending apparatus such as an antenna and a radio frequency apparatus of the base station. The second sending module is similar thereto.

The foregoing modules may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented by a processing element by scheduling a program, the processing element may be a general-purpose processor, for example, a central processing unit (Central Processing Unit, CPU) or another processor that can invoke a program. For another example, these modules may be integrated, and implemented in a system-on-a-chip (system-on-a-chip, SOC) form.

Figure 11:
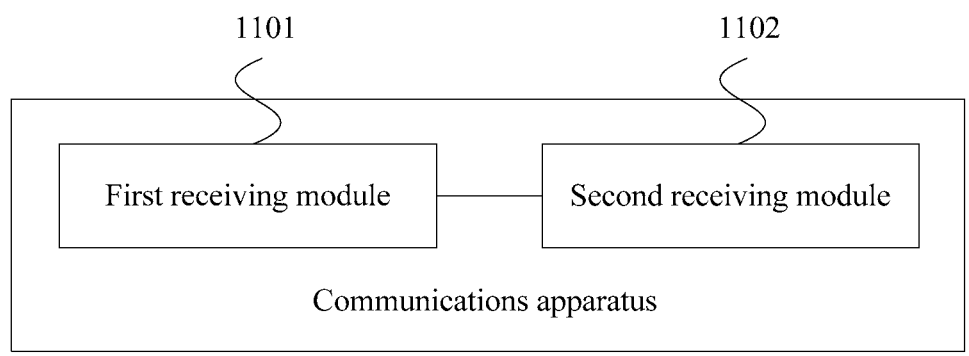
FIG. 11 is a schematic structural diagram of Embodiment 3 of a communications apparatus according to this application.

FIG. 11 is a schematic structural diagram of Embodiment 3 of a communications apparatus according to this application. The apparatus may be located on a terminal. Referring to FIG. 11, the apparatus includes: a first receiving module 1101 and a second receiving module 1102.

The first receiving module 1101 is configured to receive configuration information sent by a network device. The configuration information is used to indicate a frequency domain resource start value of a physical channel, and the physical channel is used to indicate a format of a transmission unit and/or used to indicate a quantity of symbols in a physical downlink control region in the transmission unit.

The second receiving module 1102 is configured to receive the physical channel on a resource indicated by the frequency domain resource start value.

In this embodiment, the first receiving module 1101 receives the configuration information sent by the network device. The configuration information is used to indicate the frequency domain resource start value of the physical channel, and the physical channel is used to indicate the format of the transmission unit and/or used to indicate the quantity of symbols in the physical downlink control region in the transmission unit. The second receiving module 1102 receives the physical channel on the resource indicated by the frequency domain resource start value. Because the network device sends, to the terminal, the configuration information used to indicate the frequency domain resource start value of the physical channel, and the terminal receives the physical channel on the resource indicated by the frequency domain resource start value, the physical channel can be configured more flexibly.

Optionally, the receiving, by a terminal, configuration information sent by a network device includes: receiving broadcast signaling or higher layer signaling sent by the network device. The broadcast signaling or the higher layer signaling includes the configuration information.

Optionally, a frequency domain resource to which the physical channel is mapped is determined based on one or more of a cell identity and bandwidth that corresponds to a control resource subset.

Optionally, the control resource subset is used to transmit common downlink control information, and the common downlink control information includes configuration information of at least one of a system message block SIB, a random access response RAR, and a paging message.

Optionally, the control resource subset is used to transmit user group-specific downlink control information and/or user-specific downlink control information.

Optionally, the frequency domain resource start value is a lowest PRB index corresponding to the control resource subset.

Optionally, mapping the physical channel to the resource includes: performing channel coding on an information bit corresponding to the physical channel; scrambling a coded bit, where the scrambling sequence is determined by using the cell identity and a transmission unit index; modulating a scrambled bit; and mapping a modulated symbol to the resource.

Optionally, the resource is a resource corresponding to K predefined downlink CCEs on a downlink control channel. The K CCEs are the first K CCEs of the downlink control channel.

Optionally, information corresponding to the physical channel is downlink control information, the downlink control information is carried on a downlink control channel, and the downlink control information is located in a common search space and/or a user group search space of the downlink control channel.

Optionally, the information corresponding to the physical channel is carried on L CCEs, L is a predefined quantity, and a lowest CCE index of the L CCEs is predefined. In other words, a start CCE used for the downlink control information that carries information is predefined, an aggregation level L is predefined, and a quantity of candidate sets is 1.

Optionally, the lowest CCE index is an index of the first CCE of the common search space.

Optionally, the CCE index is an index of the first CCE of the user group search space.

The foregoing apparatus may be configured to perform the method provided in the foregoing corresponding method embodiment. Specific implementations and technical effects of the apparatus are similar to those of the method. Details are not described herein again.

It should be understood that division of the modules of the foregoing communications apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the first receiving module may be a processing element separately disposed, or may be integrated into a chip of the terminal. Alternatively, the first receiving module may be stored in a memory of the terminal as a program that is invoked by a processing element of the terminal to perform a function of the first receiving module. Implementation of another module is similar thereto. In addition, all or some of these modules may be integrated, or may be separately implemented. The processing element herein may be an integrated circuit having a signal processing capability. In an implementation process, the steps of the foregoing method or the foregoing modules may be completed by using a hardware-integrated logical circuit in a processor element or an instruction in a form of software. In addition, the receiving module is a receiving control module and may receive, by using a receiving apparatus such as an antenna and a radio frequency apparatus of the terminal, information sent by the base station.

The foregoing modules may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented by a processing element by scheduling a program, the processing element may be a general-purpose processor, for example, a central processing unit (Central Processing Unit, CPU) or another processor that can invoke a program. For another example, these modules may be integrated, and implemented in a system-on-a-chip (system-on-a-chip, SOC) form.

Figure 12:
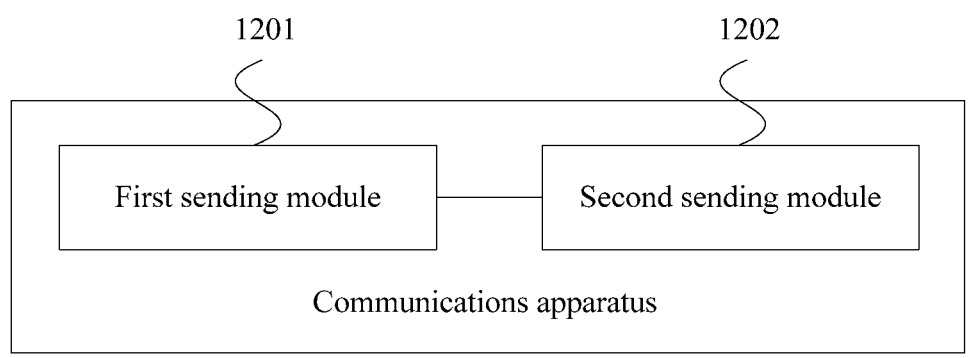
FIG. 12 is a schematic structural diagram of Embodiment 4 of a communications apparatus according to this application.

FIG. 12 is a schematic structural diagram of Embodiment 4 of a communications apparatus according to this application. The apparatus may be located on a network device. Referring to FIG. 12, the apparatus includes: a first sending module 1201 and a second sending module 1202.

The first sending module 1201 is configured to send configuration information. The configuration information is used to indicate a frequency domain resource start value of a physical channel, and the physical channel is used to indicate a format of a transmission unit and/or used to indicate a quantity of symbols in a physical downlink control region in the transmission unit.

The second sending module 1202 is configured to send the physical channel on a resource indicated by the frequency domain resource start value.

In this embodiment, the first sending module 1201 sends the configuration information. The configuration information is used to indicate the frequency domain resource start value of the physical channel, and the physical channel is used to indicate the format of the transmission unit and/or used to indicate the quantity of symbols in the physical downlink control region in the transmission unit. The second sending module 1202 sends the physical channel on the resource indicated by the frequency domain resource start value. Because the network device sends, to a terminal, the configuration information used to indicate the frequency domain resource start value of the physical channel, and sends the physical channel on the resource indicated by the frequency domain resource start value, the physical channel can be configured more flexibly.

Optionally, the sending, by a network device, configuration information includes: sending, by the network device, broadcast signaling or higher layer signaling. The broadcast signaling or the higher layer signaling includes the configuration information.

Optionally, a frequency domain resource to which the physical channel is mapped is determined based on one or more of a cell identity and bandwidth that corresponds to a control resource subset.

Optionally, the control resource subset is used to transmit common downlink control information, and the common downlink control information includes configuration information of at least one of a system message block SIB, a random access response RAR, and a paging message.

Optionally, the control resource subset is used to transmit user group-specific downlink control information and/or user-specific downlink control information.

Optionally, the frequency domain resource start value is a lowest PRB index corresponding to the control resource subset.

Optionally, mapping the physical channel to the resource includes: performing channel coding on an information bit corresponding to the physical channel; scrambling a coded bit, where the scrambling sequence is determined by using the cell identity and a transmission unit index; modulating a scrambled bit; and mapping a modulated symbol to the resource.

Optionally, the resource is a resource corresponding to K predefined downlink CCEs on a downlink control channel. The K CCEs are the first K CCEs of the downlink control channel.

Optionally, information corresponding to the physical channel is downlink control information, the downlink control information is carried on a downlink control channel, and the downlink control information is located in a common search space and/or a user group search space of the downlink control channel.

Optionally, the information corresponding to the physical channel is carried on L CCEs, L is a predefined quantity, and a lowest CCE index of the L CCEs is predefined. In other words, a start CCE used for the downlink control information that carries information is predefined, an aggregation level L is predefined, and a quantity of candidate sets is 1.

Optionally, the lowest CCE index is an index of the first CCE of the common search space.

Optionally, the CCE index is an index of the first CCE of the user group search space.

The foregoing apparatus may be configured to perform the method provided in the foregoing corresponding method embodiment. Specific implementations and technical effects of the apparatus are similar to those of the method. Details are not described herein again.

It should be understood that division of the modules of the foregoing communications apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the first sending module may be a processing element separately disposed, or may be integrated into a chip of the base station. Alternatively, the first sending module may be stored in a memory of the base station as a program that is invoked by a processing element of the base station to perform a function of the first sending module. Implementation of another module is similar thereto. In addition, all or some of these modules may be integrated, or may be separately implemented. The processing element herein may be an integrated circuit having a signal processing capability. In an implementation process, the steps of the foregoing method or the foregoing modules may be completed by using a hardware-integrated logical circuit in a processor element or an instruction in a form of software. In addition, the first sending module is a sending control module and may send information to the terminal by using a sending apparatus such as an antenna and a radio frequency apparatus of the base station. The second sending module is similar thereto.

The foregoing modules may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented by a processing element by scheduling a program, the processing element may be a general-purpose processor, for example, a central processing unit (Central Processing Unit, CPU) or another processor that can invoke a program. For another example, these modules may be integrated, and implemented in a system-on-a-chip (system-on-a-chip, SOC) form.

Figure 13:
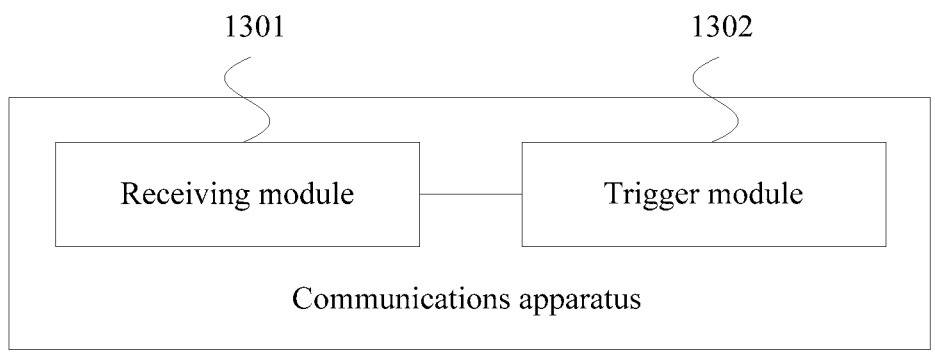
FIG. 13 is a schematic structural diagram of Embodiment 5 of a communications apparatus according to this application.

FIG. 13 is a schematic structural diagram of Embodiment 5 of a communications apparatus according to this application. The apparatus may be located on a terminal. Referring to FIG. 13, the apparatus includes: a receiving module 1301 and a trigger module 1302.

The receiving module 1301 is configured to receive DCI sent by a network device. The DCI includes configuration information, and the configuration information is used to indicate system bandwidth.

The trigger module 1302 is configured to trigger the terminal to communicate by using the system bandwidth.

In this embodiment, the receiving module 1301 receives the DCI sent by the network device. The DCI includes the configuration information, and the configuration information is used to indicate the system bandwidth. The trigger module 1302 communicates by using the system bandwidth. Because the network device indicates the available system bandwidth to the terminal, and the terminal communicates based on the system bandwidth indicated by the network device, the system bandwidth can be determined more flexibly.

Optionally, the method further includes: sending capability information. The capability information is used to indicate that the terminal supports the system bandwidth.

The foregoing apparatus may be configured to perform the method provided in the foregoing corresponding method embodiment. Specific implementations and technical effects of the apparatus are similar to those of the method. Details are not described herein again.

It should be understood that division of the modules of the foregoing communications apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the trigger module may be a processing element separately disposed, or may be integrated into a chip of the terminal. Alternatively, the trigger module may be stored in a memory of the terminal as a program that is invoked by a processing element of the terminal to perform a function of the trigger module. Implementation of another module is similar thereto. In addition, all or some of these modules may be integrated, or may be separately implemented. The processing element herein may be an integrated circuit having a signal processing capability. In an implementation process, the steps of the foregoing method or the foregoing modules may be completed by using a hardware-integrated logical circuit in a processor element or an instruction in a form of software. In addition, the receiving module is a receiving control module and may receive, by using a receiving apparatus such as an antenna and a radio frequency apparatus of the terminal, information sent by the base station.

The foregoing modules may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented by a processing element by scheduling a program, the processing element may be a general-purpose processor, for example, a central processing unit (Central Processing Unit, CPU) or another processor that can invoke a program. For another example, these modules may be integrated, and implemented in a system-on-a-chip (system-on-a-chip, SOC) form.

Figure 14:
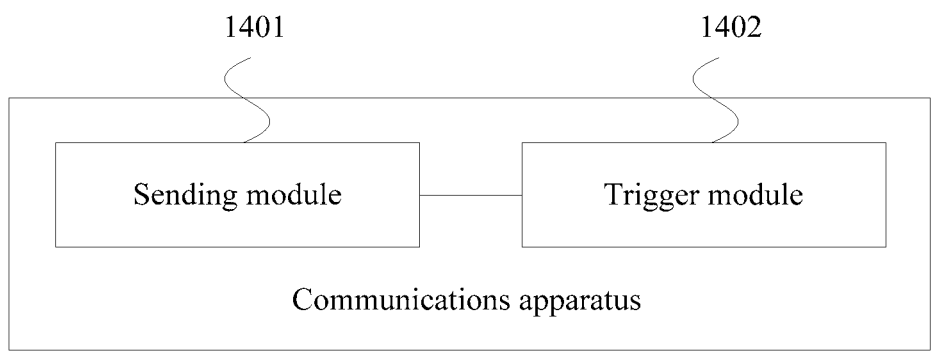
FIG. 14 is a schematic structural diagram of Embodiment 6 of a communications apparatus according to this application.

FIG. 14 is a schematic structural diagram of Embodiment 6 of a communications apparatus according to this application. The apparatus may be located on a network device. Referring to FIG. 14, the apparatus includes: a sending module 1401 and a trigger module 1402.

The sending module 1401 is configured to send DCI to a terminal. The DCI includes configuration information, and the configuration information is used to indicate system bandwidth.

The trigger module 1402 is configured to trigger the base station to communicate with the terminal by using the system bandwidth.

In this embodiment, the network device sends the DCI to the terminal. The DCI includes the configuration information, and the configuration information is used to indicate the system bandwidth. The network device communicates with the terminal by using the system bandwidth. Because the network device indicates the available system bandwidth to the terminal, and communicates with the terminal by using the system bandwidth, the system bandwidth can be determined more flexibly.

Optionally, the method further includes: sending capability information. The capability information is used to indicate that the terminal supports the system bandwidth.

The foregoing apparatus may be configured to perform the method provided in the foregoing method embodiment. Specific implementations and technical effects of the apparatus are similar to those of the method. Details are not described herein again.

It should be understood that division of the modules of the foregoing communications apparatus is merely division of logical functions. During actual implementation, all or some of the modules may be integrated into a physical entity, or may be physically separated. Moreover, these modules may be all implemented in a form of software invoked by a processing element, or may be all implemented in a form of hardware, or some modules may be implemented in a form of software invoked by a processing element, and some modules may be implemented in a form of hardware. For example, during implementation, the sending module may be a processing element separately disposed, or may be integrated into a chip of the apparatus. Alternatively, the sending module may be stored in a memory of the apparatus as a program that is invoked by a processing element of the apparatus to perform a function of the sending module. Implementation of another module is similar thereto. In addition, all or some of these modules may be integrated, or may be separately implemented. The processing element herein may be an integrated circuit having a signal processing capability. In an implementation process, the steps of the foregoing method or the foregoing modules may be completed by using a hardware-integrated logical circuit in a processor element or an instruction in a form of software. In addition, the sending module is a sending control module and may send information to the terminal by using a sending apparatus such as an antenna and a radio frequency apparatus of the base station.

The foregoing modules may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA). For another example, when one of the foregoing modules is implemented by a processing element by scheduling a program, the processing element may be a general-purpose processor, for example, a central processing unit (Central Processing Unit, CPU) or another processor that can invoke a program. For another example, these modules may be integrated, and implemented in a system-on-a-chip (system-on-a-chip, SOC) form.

Figure 15:
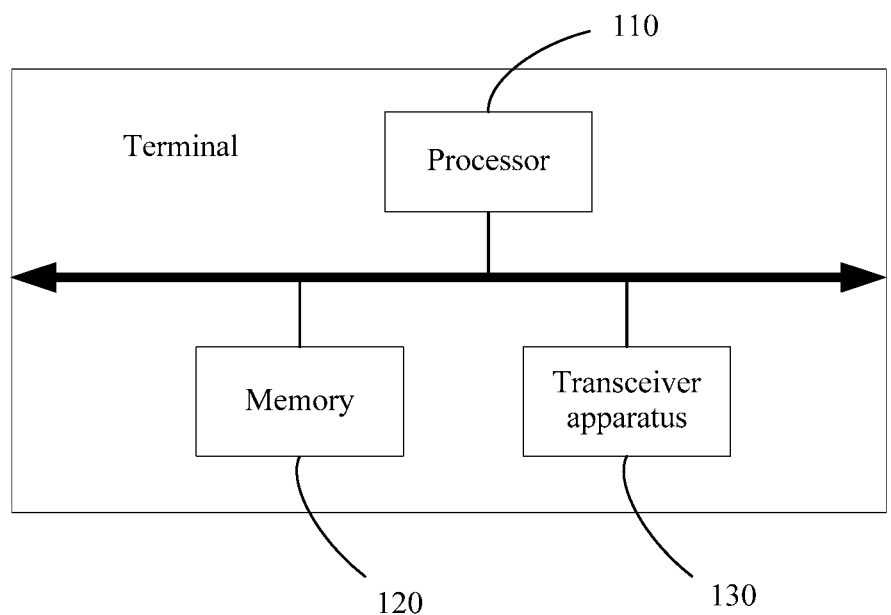
FIG. 15 is a schematic structural diagram of a terminal according to an embodiment of this application.

FIG. 15 is a schematic structural diagram of a terminal according to an embodiment of this application. Referring to FIG. 15, the terminal includes: a processor 110, a memory 120, and a transceiver apparatus 130. The transceiver apparatus 130 may be connected to an antenna. In a downlink direction, the transceiver apparatus 130 receives, by using the antenna, information sent by a network device, and sends the information to the processor 110 for processing. In an uplink direction, the processor 110 processes data of the terminal, and sends the data of the terminal to the network device by using the transceiver apparatus 130.

The memory 120 is configured to store a program for implementing the foregoing method embodiment, or the modules in the embodiment shown in FIG. 9, FIG. 11, or FIG. 13. The processor 110 invokes the program, to perform operations in the foregoing method embodiment, to implement the modules shown in FIG. 9, FIG. 11, or FIG. 13.

Alternatively, some or all of the foregoing units may be embedded as an integrated circuit in a chip of the terminal. Moreover, they may be separately implemented, or may be integrated. In other words, the foregoing units may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA).

Figure 16:
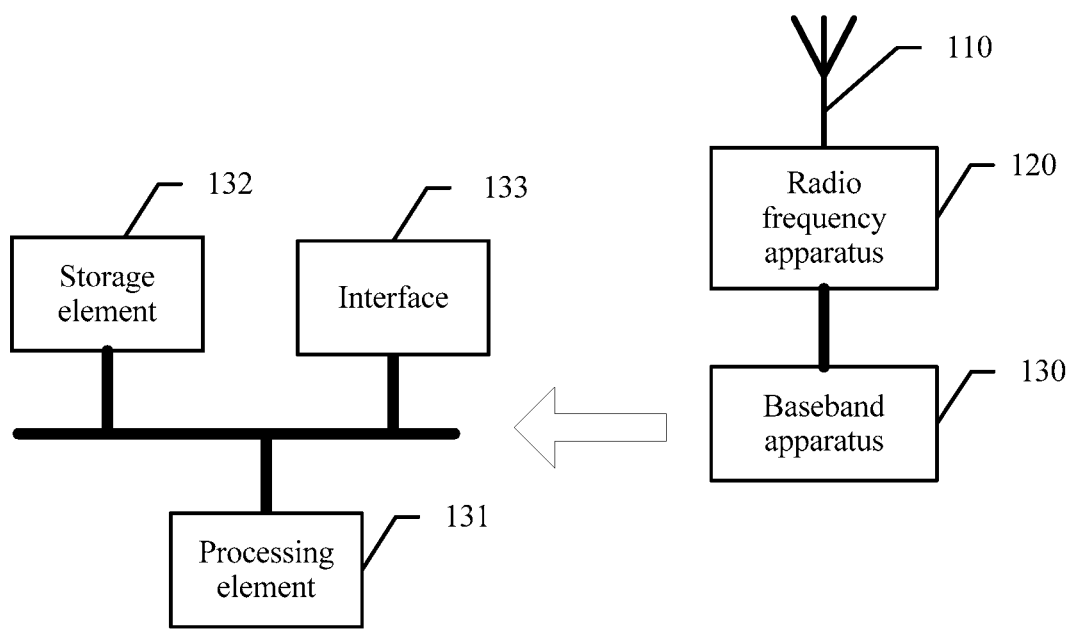
FIG. 16 is a schematic structural diagram of a network device according to an embodiment of this application.

FIG. 16 is a schematic structural diagram of a network device according to an embodiment of this application. Referring to FIG. 16, the network device includes: an antenna 110, a radio frequency apparatus 120, and a baseband apparatus 130. The antenna 110 is connected to the radio frequency apparatus 120. In an uplink direction, the radio frequency apparatus 120 receives, by using the antenna 110, information sent by a terminal and sends, to the baseband apparatus 130 for processing, the information sent by the terminal. In a downlink direction, the baseband apparatus 130 processes information that is for the terminal, and sends the information for the terminal to the radio frequency apparatus 120, and the radio frequency apparatus 120 processes the information for the terminal, and then sends the information for the terminal to the terminal by using the antenna 110.

The foregoing communications apparatus may be located on the baseband apparatus 130. In an implementation, the foregoing units are implemented by a processing element by scheduling a program. For example, the baseband apparatus 130 includes a processing element 131 and a storage element 132. The processing element 131 invokes a program stored in the storage element 132, to perform the method in the foregoing method embodiment. In addition, the baseband apparatus 130 may further include an interface 133, configured to exchange information with the radio frequency apparatus 120. The interface is, for example, a common public radio interface (common public radio interface, CPRI).

In another implementation, the foregoing units may be configured as one or more processing elements for implementing the foregoing method. These processing elements are disposed on the baseband apparatus 130. The processing element herein may be an integrated circuit, for example, one or more ASICs, one or more DSPs, or one or more FPGAs. These integrated circuits may be integrated to form a chip.

For example, the foregoing units may be integrated, and implemented in a system-on-a-chip (system-on-a-chip, SOC) form. For example, the baseband apparatus 130 includes an SOC chip, configured to implement the foregoing method. The chip may be integrated with the processing element 131 and the storage element 132, and the processing element 131 invokes the program stored in the storage element 132 to implement the foregoing method or functions of the foregoing units. Alternatively, the chip may be integrated with at least one integrated circuit, to implement the foregoing method or functions of the foregoing units. Alternatively, the foregoing implementations may be combined in a manner that functions of some units are implemented by the processing element by invoking a program, and functions of some units are implemented by an integrated circuit.

In conclusion, regardless of which manner is used, the foregoing communications apparatus includes at least one processing element, a storage element, and a communications interface. The at least one processing element is configured to perform the method provided in the foregoing method embodiment. The processing element may perform some or all steps in the foregoing method embodiment in a first manner, that is, a manner of executing a program stored in the storage element; or may perform some or all steps in the foregoing method embodiment in a second manner, that is, a manner of using a hardware-integrated logical circuit in a processor element in combination with an instruction; or certainly, may perform the method provided in the foregoing method embodiment by combining the first manner and the second manner.

The processing element herein is the same as that in the foregoing description, and may be a general-purpose processor, for example, a central processing unit (Central Processing Unit, CPU), or may be configured as one or more integrated circuits for implementing the foregoing method, for example, one or more application-specific integrated circuits (Application-Specific Integrated Circuit, ASIC), one or more microprocessors (digital signal processor, DSP), or one or more field programmable gate arrays (Field Programmable Gate Array, FPGA).

The storage element may be a memory, or may be a collective name for a plurality of storage elements.

What is claimed is:

1. A communication method, comprising:
   receiving, by a first receiver of a terminal, configuration information sent by a network device, wherein the configuration information indicates a resource in a plurality of candidate resources of a common search space, and wherein the plurality of candidate resources of the common search space are based on a cell identity, downlink bandwidth, a frequency domain resource location of a synchronization channel, and a frequency domain resource location of a broadcast channel; and
   in response to receiving the configuration information by the first receiver of the terminal, receiving, by a second receiver of the terminal different from the first receiver of the terminal, common control information on the resource indicated by the configuration information.

2. The method according to claim 1, wherein the receiving, by a first receiver of a terminal, configuration information sent by a network device comprises:
   receiving, by the first receiver of the terminal, a master system information block (MIB) message sent by the network device, wherein the MIB message comprises the configuration information.

3. The method according to claim 1, wherein the common control information comprises configuration information of at least one of a system message block (SIB), a random access response (RAR), and a paging message.

4. The method according to claim 1, wherein the configuration information comprises indexes of the plurality of candidate resources.

5. The method according to claim 1, wherein the configuration information indicates a frequency domain resource start value of the resource.

6. The method according to claim 1, wherein the common control information comprises downlink control information (DCI), and wherein the DCI indicates at least one of a format of a transmission unit or a quantity of symbols in a physical downlink control region in the transmission unit.

7. The method according to claim 6, wherein the common control information comprises the DCI, wherein the DCI comprises configuration information, and wherein the configuration information comprised in the DCI indicates system bandwidth.

8. The method according to claim 7, wherein the method further comprises:
   communicating, by the terminal, by using the system bandwidth.

9. A communication method, comprising:
   sending, by a network device, configuration information, wherein the configuration information indicates a resource in a plurality of candidate resources of a common search space, and wherein the plurality of candidate resources of the common search space are based on a cell identity, downlink bandwidth, a frequency domain resource location of a synchronization channel, and a frequency domain resource location of a broadcast channel; and
   in response to sending the configuration information, sending, by the network device, common control information on the resource indicated by the configuration information.

10. The method according to claim 9, wherein the sending, by a network device, configuration information comprises:
    sending, by the network device, a master system information block (MIB) message, wherein the MIB message comprises the configuration information.

11. The method according to claim 9, wherein the common control information comprises configuration information of at least one of a system message block (SIB), a random access response (RAR), and a paging message.

12. The method according to claim 9, wherein the configuration information comprises indexes of the plurality of candidate resources.

13. The method according to claim 9, wherein the configuration information indicates a frequency domain resource start value of the resource.

14. The method according to claim 9, wherein the common control information comprises downlink control information (DCI), and wherein the DCI indicates at least one of a format of a transmission unit or a quantity of symbols in a physical downlink control region in the transmission unit.

15. The method according to claim 14, wherein the common control information comprises the DCI, wherein the DCI comprises configuration information, and wherein the configuration information comprised in the DCI indicates system bandwidth.

16. A communications apparatus, located on a terminal and comprising:
    a first receiver, the first receiver configured to receive configuration information sent by a network device, wherein the configuration information indicates a resource in a plurality of candidate resources of a common search space, and wherein the plurality of candidate resources of the common search space are based on a cell identity, downlink bandwidth, a frequency domain resource location of a synchronization channel, and a frequency domain resource location of a broadcast channel; and
    a second receiver, the second receiver configured to receive common control information on the resource indicated by the configuration information in response to the first receiver receiving the configuration information, wherein the second receiver is different from the first receiver.

17. The apparatus according to claim 16, wherein the first receiver is configured to receive a master system information block (MIB) message sent by the network device, and wherein the MIB message comprises the configuration information.

18. The apparatus according to claim 16, wherein the common control information comprises configuration information of at least one of a system message block (SIB), a random access response (RAR), and a paging message.

19. The method according to claim 1, wherein the configuration information is comprised in a field of a master system information block (MIB), the field has a length of $\log_2 M$, and M is a quantity of the plurality of candidate resources of the common search space.

* * * * *